United States Patent
Heo et al.

(10) Patent No.: US 12,079,038 B2
(45) Date of Patent: Sep. 3, 2024

(54) ELECTRONIC DEVICE INCLUDING FOLDABLE HOUSING

(71) Applicant: Samsung Electronics Co., Ltd., Suwon-si (KR)

(72) Inventors: Jeonhoe Heo, Suwon-si (KR); Jonghwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 177 days.

(21) Appl. No.: 17/664,982

(22) Filed: May 25, 2022

(65) Prior Publication Data
US 2022/0404871 A1    Dec. 22, 2022

Related U.S. Application Data

(63) Continuation of application No. PCT/KR2022/006722, filed on May 11, 2022.

(30) Foreign Application Priority Data

Jun. 21, 2021    (KR) .................. 10-2021-0080031

(51) Int. Cl.
    *G06F 1/16*    (2006.01)

(52) U.S. Cl.
    CPC .......... *G06F 1/1652* (2013.01); *G06F 1/1618* (2013.01); *G06F 1/1681* (2013.01); *G06F 1/1683* (2013.01)

(58) Field of Classification Search
    CPC .... G06F 1/1618; G06F 1/1652; G06F 1/1656; G06F 1/1681; G06F 1/1683; G06F 1/1698
    See application file for complete search history.

(56) References Cited

U.S. PATENT DOCUMENTS 8,551,283 B2    10/2013    Pakula et al.
8,576,561 B2    11/2013    Myers et al.
(Continued)

FOREIGN PATENT DOCUMENTS

JP    2013-119188 A    6/2013
KR    10-2014-0013846 A    2/2014
(Continued)

OTHER PUBLICATIONS

International Search Report and Written Opinion of the International Searching Authority dated Aug. 31, 2022, in connection with International Application No. PCT/KR2022/006722, 5 pages.

*Primary Examiner* — Adrian S Wilson

(57) ABSTRACT

According to various embodiments of the disclosure, an electronic device includes a first housing including a first side member that surrounds a first inner space, a second housing including a second side member that surrounds a second inner space, and a display, at least a portion of which is folded, the display disposed in a space provided by the first housing and the second housing. At least one of the first side member and the second side member includes a plurality of conductive areas spaced apart from each other, at least one non-conductive area disposed between the plurality of conductive areas to bond the plurality of conductive areas, and at least one bridge member that at least partially surrounded by the at least one non-conductive area and connects at least two of the plurality of conductive areas.

20 Claims, 23 Drawing Sheets

(56) References Cited

U.S. PATENT DOCUMENTS

| | | | |
|---|---|---|---|
| 8,772,650 B2 | 7/2014 | Merz et al. | |
| 8,964,380 B2 * | 2/2015 | Lee | G06F 1/1656 |
| | | | 361/679.01 |
| 9,049,279 B2 * | 6/2015 | Choi | H04M 1/0264 |
| 9,182,842 B2 * | 11/2015 | Cho | G06F 1/1671 |
| 9,258,393 B2 * | 2/2016 | Park | H04M 1/0277 |
| 9,337,882 B2 | 5/2016 | Song et al. | |
| 9,655,261 B2 | 5/2017 | Wu et al. | |
| 9,829,926 B2 | 11/2017 | Myers et al. | |
| 9,876,893 B2 * | 1/2018 | Yoo | H04W 4/50 |
| 9,894,787 B2 | 2/2018 | Merz et al. | |
| 10,079,425 B2 * | 9/2018 | Chun | H01Q 1/22 |
| 10,148,000 B2 | 12/2018 | Hill et al. | |
| 10,356,923 B2 | 7/2019 | Wu et al. | |
| 10,433,442 B2 | 10/2019 | Merz et al. | |
| 10,534,405 B2 | 1/2020 | Kim et al. | |
| 10,559,872 B2 | 2/2020 | Hill et al. | |
| 10,729,026 B2 | 7/2020 | Wu et al. | |
| 10,821,638 B2 | 11/2020 | Huang et al. | |
| 10,952,341 B2 | 3/2021 | Wu et al. | |
| 11,039,544 B2 | 6/2021 | Merz et al. | |
| 11,223,105 B2 | 1/2022 | Hill et al. | |
| 11,503,142 B2 * | 11/2022 | Lee | H04M 1/0266 |
| 11,581,629 B2 | 2/2023 | Hill et al. | |
| 11,844,181 B2 * | 12/2023 | Zhao | H05K 5/0217 |
| 2012/0175165 A1 | 7/2012 | Merz et al. | |
| 2014/0031093 A1 | 1/2014 | Song et al. | |
| 2014/0125528 A1 * | 5/2014 | Tsai | H01Q 1/243 |
| | | | 343/702 |
| 2014/0284096 A1 | 9/2014 | Wu et al. | |
| 2015/0122540 A1 | 5/2015 | Myers et al. | |
| 2016/0134010 A1 * | 5/2016 | Yan | H01Q 1/48 |
| | | | 343/702 |
| 2017/0069956 A1 | 3/2017 | Hill et al. | |
| 2018/0210508 A1 * | 7/2018 | Aurongzeb | G06F 1/1652 |
| 2018/0299929 A1 | 10/2018 | Kim et al. | |
| 2019/0070760 A1 * | 3/2019 | Huang | H04M 1/0202 |
| 2020/0076056 A1 | 3/2020 | Froese et al. | |
| 2020/0076057 A1 | 3/2020 | Leutheuser et al. | |
| 2020/0245481 A1 * | 7/2020 | Yoon | G06F 1/1652 |
| 2021/0382525 A1 | 12/2021 | Myers et al. | |
| 2022/0006176 A1 | 1/2022 | Froese et al. | |
| 2022/0075422 A1 | 3/2022 | Myers et al. | |
| 2022/0354007 A1 | 11/2022 | Wu et al. | |
| 2023/0105418 A1 | 4/2023 | Merz et al. | |

FOREIGN PATENT DOCUMENTS

| | | |
|---|---|---|
| KR | 10-2016-0066628 A | 6/2016 |
| KR | 10-2018-0115153 A | 10/2018 |
| KR | 10-2020-0026000 A | 3/2020 |
| KR | 10-2020-0092586 A | 8/2020 |
| WO | 2015136886 A1 | 9/2015 |

* cited by examiner

ELECTRONIC DEVICE INCLUDING FOLDABLE HOUSING

CROSS-REFERENCE TO RELATED APPLICATIONS

This application is a Bypass Continuation of International Application No. PCT/KR2022/006722, which was filed on May 11, 2022, and is based on and claims priority under 35 U.S.C. § 119 to Korean Patent Application No. 10-2021-0080031, which was filed in the Korean Intellectual Property Office on Jun. 21, 2021, the entire disclosure of each of which is incorporated herein by reference.

BACKGROUND

1. Field

Embodiments of the disclosure described herein relate to an electronic device including a foldable housing.

2. Description of Related Art

Electronic devices (e.g., mobile phones) may acoustically or visually output information stored therein. With the high integration of the electronic devices and the wide use of high-speed, high-capacity wireless communication, various functions are integrated in a single mobile communication terminal. For example, not only is a communication function integrated but also entertainment functions such as a game, a multimedia functions such as music/video playback, communication and security functions for mobile banking, schedule management functions, and electronic wallet functions are integrated in a single device electronic device. As the electronic device is able to perform various functions, a plurality of various electronic components may be included in the electronic device.

SUMMARY

The housing that forms the exterior of the electronic device to protect the electronic components from an external impact may be formed of a plurality of conductive areas divided from one another. An adhesive insulating member (or, a non-conductive area) having an adhesive effect and an insulating effect may be disposed between the conductive areas divided from one another. However, when the electronic device is dropped or impacted, the adhesive insulating member may be cut or pressed. Therefore, at least a portion of a structure (e.g., an optical film, a back cover, or a window) disposed around the adhesive insulating member may be damaged.

Various embodiments of the disclosure provide an electronic device including a side member for securing stiffness.

An electronic device according to an embodiment of the disclosure includes a hinge, a first housing including a first side member that surrounds a first inner space disposed on a side of the hinge, a second housing including a second side member that surrounds a second inner space disposed on an opposite side of the hinge from the side that the first side member is disposed, and a display, at least a portion of which is folded, the display disposed in a space provided by the first housing and the second housing. At least one of the first side member and the second side member includes a plurality of conductive areas spaced apart from each other, at least one non-conductive area disposed between the plurality of conductive areas to bond the plurality of conductive areas, and at least one bridge member that is at least partially surrounded by the at least one non-conductive area and connects at least two of the plurality of conductive areas.

A foldable housing foldable with respect to a hinge according to an embodiment of the disclosure includes a first housing including a first side member that surrounds a first inner space disposed on a side of the hinge and a second housing including a second side member that surrounds a second inner space disposed on an opposite side of the hinge from the side that the first side member is disposed. The first side member includes a first conductive area including a first inner surface, a second conductive area including a second inner surface that faces the first inner surface, a first bridge member that connects the first conductive area and the second conductive area in the first inner space, and a first non-conductive area disposed between the first inner surface, the second inner surface, and the first bridge member to bond the first conductive area, the second conductive area, and the first bridge member. The second side member includes a third conductive area that is symmetrical to the first conductive area with respect to the hinge and includes a third inner surface, a fourth conductive area including a fourth inner surface that faces the third inner surface, a second bridge member that connects the third conductive area and the fourth conductive area in the second inner space, and a second non-conductive area disposed between the third inner surface, the fourth inner surface, and the second bridge member to bond the third conductive area, the fourth conductive area, and the second bridge member.

According to the embodiments of the disclosure, the first conductive area and the second conductive area included in the side member of the electronic device may be connected through the bridge member. Accordingly, an adhesive insulating member may be prevented from being cut or pressed when the electronic device is dropped or impacted.

The electronic device according to the embodiments of the disclosure may prevent damage to components disposed around the adhesive insulating member.

In addition, the disclosure may provide various effects that are directly or indirectly recognized.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 13B illustrates a closed state of the electronic device in which the first side member and the second side member are coupled.

FIG. 14B illustrates a closed state of the electronic device in which the first side member and the second side member are coupled.

With regard to description of the drawings, identical or similar reference numerals may be used to refer to identical or similar components.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
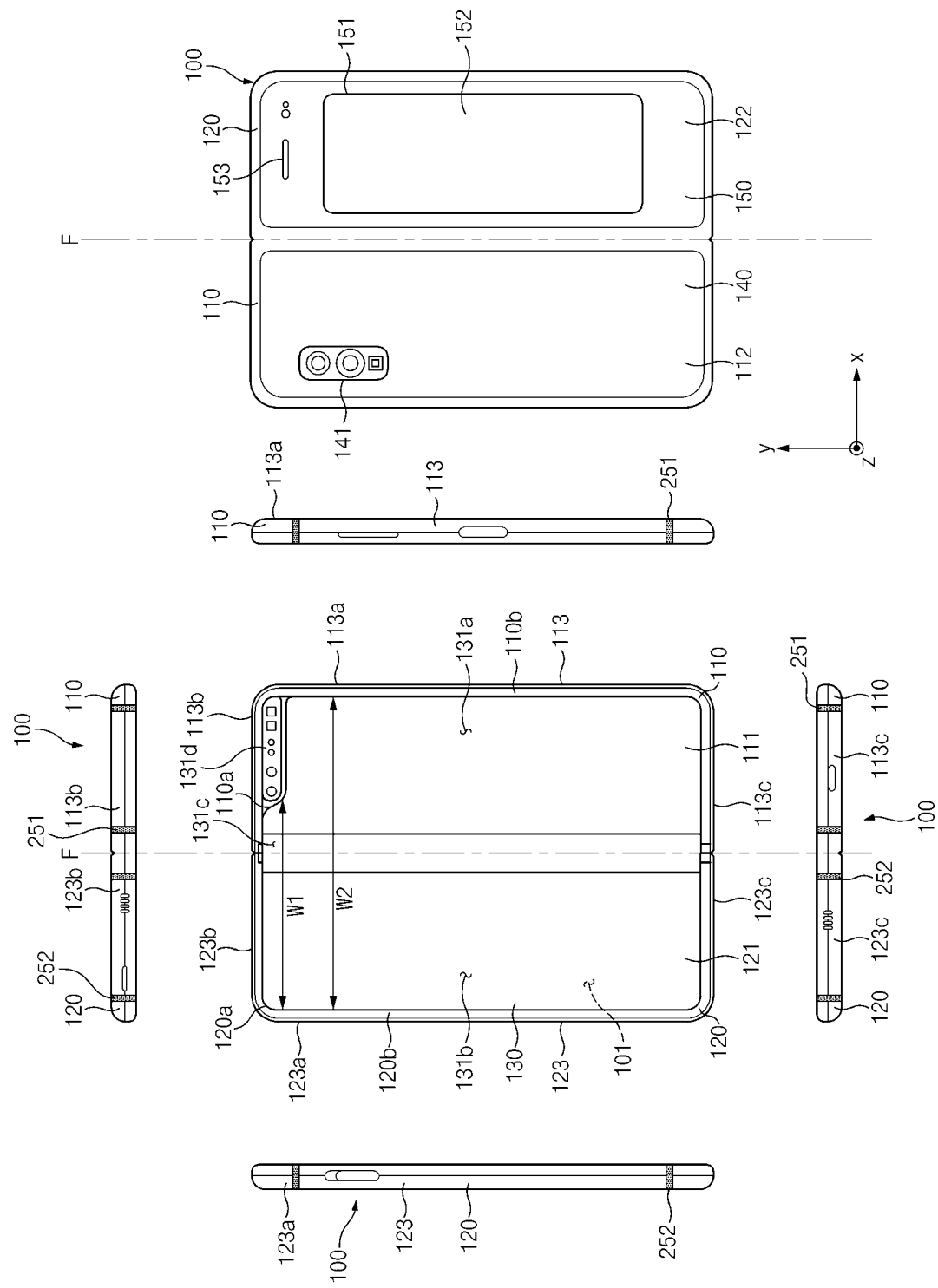
FIG. 1 is a view illustrating a flat state of an electronic device according to various embodiments of the disclosure.
Figure 2:
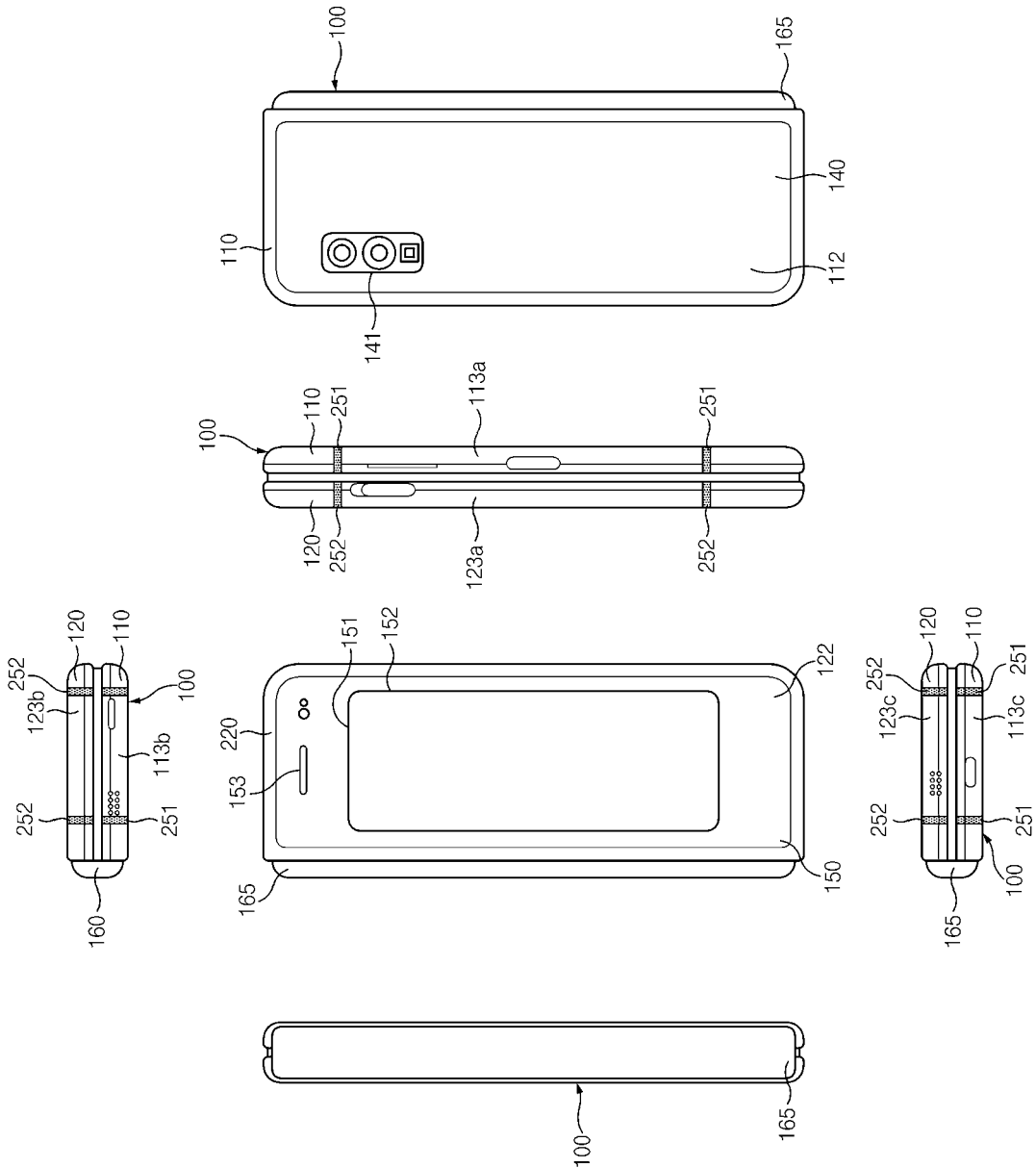
FIG. 2 is a view illustrating a folded state of the electronic device of FIG. 1 according to various embodiments of the disclosure.

FIG. 1 is a view illustrating a flat state of an electronic device 100 according to various embodiments of the disclosure. FIG. 2 is a view illustrating a folded state of the electronic device 100 of FIG. 1 according to various embodiments of the disclosure.

Referring to FIG. 1, the electronic device 100 may include a pair of housings 110 and 120 (e.g., foldable housings) rotatably coupled through a hinge (e.g., a hinge 164 of FIG. 3) so as to be folded relative to each other, a hinge cover (e.g., a hinge cover 165 of FIG. 2) that covers foldable portions of the pair of housings 110 and 120, and a display 130 (e.g., a flexible display or a foldable display) disposed in the space formed by the pair of housings 110 and 120. In this disclosure, the surface on which the display 130 is disposed may be defined as the front surface of the electronic device 100, and the surface facing away from the front surface may be defined as the rear surface of the electronic device 100. Furthermore, the surfaces surrounding the space between the front surface and the rear surface may be defined as the side surfaces of the electronic device 100.

In certain embodiments, the pair of housings 110 and 120 may include the first housing 110 including a sensor area 131d, the second housing 120, a first back cover 140, and a second back cover 150. The pair of housings 110 and 120 of the electronic device 100 are not limited to the form and coupling illustrated in FIGS. 1 and 2 and may be implemented by a combination and/or coupling of other shapes or components. For example, in certain embodiments, the first housing 110 may be integrally formed with the first back cover 140, and the second housing 120 may be integrally formed the second back cover 150.

According to certain embodiments, the first housing 110 and the second housing 120 may be disposed on opposite sides with respect to a folding axis (an axis F) and may have entirely symmetrical shapes with respect to the folding axis (the axis F). According to certain embodiments, the angle or distance between the first housing 110 and the second housing 120 may vary depending on whether the electronic device 100 is in a flat state (or, an unfolded state), a folded state, or an intermediate state. According to certain embodiments, unlike the second housing 120, the first housing 110 may additionally include the sensor area 131d in which various sensors are disposed. However, the first housing 110 and the second housing 120 may have shapes symmetrical to each other in the other areas. In certain embodiments, the sensor area 131d may be additionally disposed in, or replaced with, at least a partial area of the second housing 120.

Figure 3:
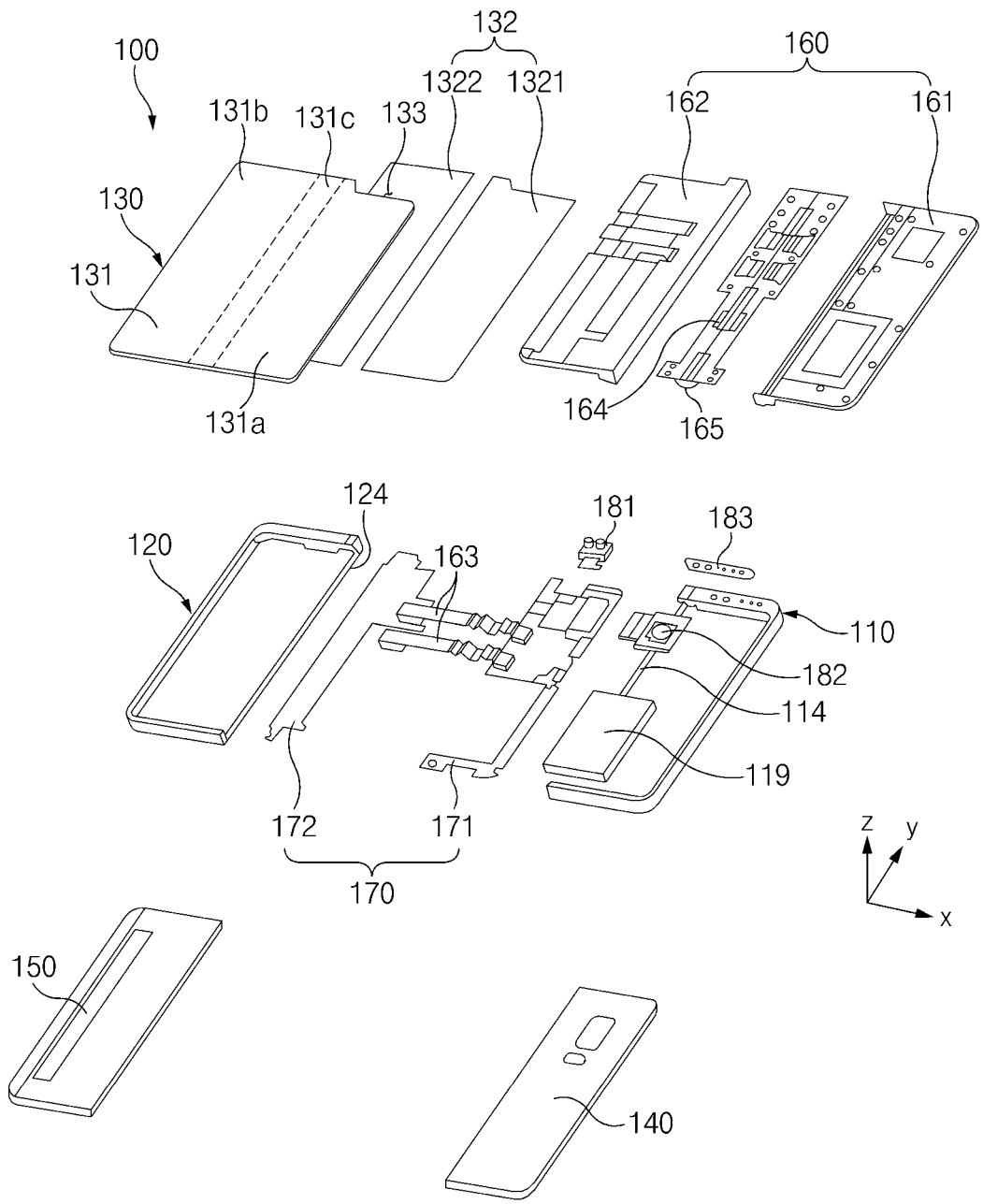
FIG. 3 is an exploded perspective view of the electronic device according to various embodiments of the disclosure.

In certain embodiments, the electronic device 100 may be operated in an in-folding manner and/or an out-folding manner as the first housing 110 is rotated in the range of 0 degrees to 360 degrees relative to the second housing 120 through the hinge (e.g., the hinge 164 of FIG. 3). According to various embodiments, the hinge 164 may be formed in the vertical direction or the horizontal direction when the electronic device 100 is viewed from above. According to various embodiments, the hinge 164 may include a plurality of hinges. For example, the plurality of hinges may all be arranged in the same direction. In another example, some of the plurality of hinges may be arranged in different directions and folded.

In certain embodiments, the first housing 110 may include a first surface 111 connected to the hinge (e.g., the hinge 164 of FIG. 3) in the flat state of the electronic device 100 and disposed to face toward the front surface of the electronic device 100, a second surface 112 facing away from the first surface 111, and a first side member 113 surrounding at least a portion of the space between the first surface 111 and the second surface 112. In certain embodiments, the first side member 113 may include a first side surface 113a disposed parallel to the folding axis (the axis F), a second side surface 113b extending from one end of the first side surface 113a in a direction perpendicular to the folding axis, and a third side surface 113c extending from an opposite end of the first side surface 113a in the direction perpendicular to the folding axis (the axis F).

In certain embodiments, the second housing 120 may include a third surface 121 connected to the hinge (e.g., the hinge 164 of FIG. 3) in the flat state of the electronic device 100 and disposed to face toward the front surface of the electronic device 100, a fourth surface 122 facing away from the third surface 121, and a second side member 123 surrounding at least a portion of the space between the third surface 121 and the fourth surface 122. In certain embodiments, the second side member 123 may include a fourth side surface 123a disposed parallel to the folding axis (the axis F), a fifth side surface 123b extending from one end of the fourth side surface 123a in a direction perpendicular to the folding axis (the axis F), and a sixth side surface 123c extending from an opposite end of the fourth side surface 123a in the direction perpendicular to the folding axis (the axis F). In certain embodiments, the third surface 121 may face the first surface 111 in the folded state.

In certain embodiments, the electronic device 100 may include a recess 101 formed to accommodate the display 130 through a structural shape coupling of the first housing 110 and the second housing 120. The recess 101 may have substantially the same size as the display 130. In certain embodiments, due to the sensor area 131d, the recess 101 may have two or more different widths in the direction perpendicular to the folding axis (the axis F). For example, the recess 101 may have a first width W1 between a first portion 120a of the second housing 120 that is parallel to the folding axis (the axis F) and a first portion 110a of the first housing 110 that is formed on the periphery of the sensor area 131d and a second width W2 formed by a second portion 120b of the second housing 120 and a second portion 110b of the first housing 110 that does not correspond to the sensor area 131d and that is parallel to the folding axis (the axis F). In this case, the second width W2 may be formed to be longer than the first width W1. For example, the recess 101 may be formed to have the first width W1 between the first portion 110a of the first housing 110 and the first portion 120a of the second housing 120 that have shapes asymmetrical to each other and the second width W2 between the second portion 110b of the first housing 110 and the second portion 120b of the second housing 120 that have shapes symmetrical to each other. In certain embodiments, the first portion 110a and the second portion 110b of the first housing 110 may be formed to have different distances from the folding axis (the axis F). The width of the recess 101 is not limited to the illustrated example. In various embodiments, the recess 101 may have two or more different widths due to the form of the sensor area 131d or the asymmetrically-shaped portions of the first housing 110 and the second housing 120.

In certain embodiments, at least a portion of the first housing 110 and at least a portion of the second housing 120 may be formed of a metallic material or a non-metallic material that has a stiffness of a selected magnitude to support the display 130.

In certain embodiments, the sensor area 131d may be formed to have a predetermined area adjacent to one corner of the first housing 110. However, the arrangement, shape, or size of the sensor area 131d is not limited to the illustrated example. For example, in certain embodiments, the sensor area 131d may be provided in another corner of the first housing 110 or in any area between an upper corner and a lower corner of the first housing 110. In certain embodiments, the sensor area 131d may be disposed in at least a partial area of the second housing 120. In certain embodiments, the sensor area 131d may be disposed to extend to the first housing 110 and the second housing 120. In certain embodiments, the electronic device 100 may include components that perform various functions and that are exposed on the front surface of the electronic device 100 though the sensor area 131d or one or more openings formed in the sensor area 131d. In various embodiments, the components may include, for example, at least one of a front camera device, a receiver, a proximity sensor, an illuminance sensor, an iris recognition sensor, an ultrasonic sensor, and an indicator.

In certain embodiments, the first back cover 140 may be disposed on the second surface 112 of the first housing 110 and may have a substantially rectangular periphery. In certain embodiments, at least a portion of the periphery may be surrounded by the first housing 110. Similarly, the second back cover 150 may be disposed on the fourth surface 122 of the second housing 120, and at least a portion of the periphery of the second back cover 150 may be surrounded by the second housing 120.

In the illustrated embodiment, the first back cover 140 may have a substantially symmetrical shape to the second back cover 150 with respect to the folding axis (the axis F). In certain embodiments, the first back cover 140 and the second back cover 150 may include a variety of different shapes. In certain embodiments, the first back cover 140 may be integrally formed with the first housing 110, and the second back cover 150 may be integrally formed with the second housing 120.

In certain embodiments, the first back cover 140, the second back cover 150, the first housing 110, and the second housing 120 may provide, through a mutually coupled structure, a space in which various components (e.g., a printed circuit board, an antenna module, a sensor module, or a battery) of the electronic device 100 are disposed. In certain embodiments, one or more components may be disposed, or visually exposed, on the rear surface of the electronic device 100. For example, one or more components or sensors may be visually exposed through a first rear area 141 of the first back cover 140. In various embodiments, the sensors may include a proximity sensor, a rear camera device, and/or a flash. In certain embodiments, at least a portion of a sub-display 152 may be visually exposed through a second rear area 151 of the second back cover 150. In certain embodiments, the electronic device 100 may include a speaker module 153 disposed through at least a partial area of the second back cover 150.

The display 130 may be disposed over the space formed by the pair of housings 110 and 120. For example, the display may be mounted in the recess 101 formed by the pair of housings 110 and 120 and may be disposed to substantially occupy most of the front surface of the electronic device 100. Accordingly, the front surface of the electronic device 100 may include the display 130, a partial area (e.g., a peripheral area) of the first housing 110 that is adjacent to the display 130, and a partial area (e.g., a peripheral area) of the second housing 120 that is adjacent to the display 130. In certain embodiments, the rear surface of the electronic device 100 may include the first back cover 140, a partial area (e.g., a peripheral area) of the first housing 110 that is adjacent to the first back cover 140, the second back cover 150, and a partial area (e.g., a peripheral area) of the second housing 120 that is adjacent to the second back cover 150.

In certain embodiments, the display 130 may refer to a display, at least a partial area of which is able to be deformed to be flat or curved. In certain embodiments, the display 130 may include a third area 131c, a first area 131a disposed on one side of the third area 131c (e.g., the right side of the third area 131c), and a second area 131b disposed on an opposite side of the third area 131c (e.g., the left side of the third area 131c). For example, the first area 131a may be disposed on the first surface 111 of the first housing 110, and the second area 131b may be disposed on the third surface 121 of the second housing 120. In certain embodiments, the division of the display 130 into the areas is illustrative, and the display 130 may be divided into a plurality of areas (e.g., four or more areas, or two areas) depending on the structure or function of the display 130. For example, in the embodiment illustrated in FIG. 1, the areas of the display 130 may be divided from each other by the third area 131c or the folding axis (the axis F) that extends parallel to the y-axis. However, in certain embodiments, the display 130 may be divided into areas with respect to a different third area (e.g., a third area parallel to the x-axis) or a different folding axis (e.g., a folding axis parallel to the x-axis). The above-described division of the display into the areas may merely be a physical division by the pair of housings 110 and 120 and the hinge (e.g., the hinge 164 of FIG. 3), and one full screen may be displayed on the display 130 substantially through the pair of housings 110 and 120 and the hinge (e.g., the hinge 164 of FIG. 3). In certain embodiments, the first area 131a and the second area 131b may have shapes entirely symmetrical to each other with respect to the third area 131c. However, unlike the second area 131b, the first area 131a may include a notch area (e.g., a notch area 133 of FIG. 3) that is cut depending on the presence of the sensor area 131d, and in the other area, the first area 131a may have a shape symmetrical to the second area 131b. For example, the first area 131a and the second area 131b may include portions having shapes symmetrical to each other and portions having shapes asymmetrical to each other.

Referring to FIG. 2, the hinge cover 165 may be disposed between the first housing 110 and the second housing 120 and may be configured to hide an internal component (e.g., the hinge 164 of FIG. 3). In certain embodiments, the hinge cover 165 may be hidden by a portion of the first housing 110 and a portion of the second housing 120, or may be exposed to the outside, depending on an operational state (the flat state or the folded state) of the electronic device 100.

For example, when the electronic device 100 is in the flat state as illustrated in FIG. 1, the hinge cover 165 may be hidden by the first housing 110 and the second housing 120 and may not be exposed. In another example, when the electronic device 100 is in the folded state (e.g., a completely folded state) as illustrated in FIG. 2, the hinge cover 165 may be exposed to the outside from between the first housing 110 and the second housing 120. In another example, when the electronic device 100 is in the intermediate state in which the first housing 110 and the second housing 120 are folded with a certain angle, the hinge cover 165 may be at least partially exposed outside the electronic device 100 from between the first housing 110 and the second housing 120. In this case, the exposed area may be smaller than the exposed area in the completely folded state. In certain embodiments, the hinge cover 165 may include a curved surface.

Hereinafter, operations of the first housing 110 and the second housing 120 and the areas of the display 130 depending on an operational state (e.g., the flat state or the folded state) of the electronic device 100 will be described.

In certain embodiments, when the electronic device 100 is in the flat state (e.g., the state of FIG. 1), the first housing 110 and the second housing 120 may form an angle of 180 degrees, and the first area 131a and the second area 131b of the display may be disposed to face the same direction. Furthermore, the third area 131c may form the same plane as the first area 131a and the second area 131b. In certain embodiments, when the electronic device 100 is in the flat state, the first housing 110 may rotate relative to the second housing 120 through an angle of 360 degrees and may be oppositely folded such that the second surface 112 faces the fourth surface 122.

In certain embodiments, when the electronic device 100 is in the folded state (e.g., the state of FIG. 2), the first housing 110 and the second housing 120 may be disposed to face each other. The first area 131a and the second area 131b of the display 130 may face each other while forming a narrow angle (e.g., between 0 degrees and 10 degrees). At least a portion of the third area 131c may be curved to have a certain curvature.

In certain embodiments, when the electronic device 100 is in the intermediate state, the first housing 110 and the second housing 120 may be disposed at a certain angle. The first area 131a and the second area 131b of the display 130 may form an angle larger than that in the folded state and smaller than that in the flat state. At least a portion of the third area 131c may be curved to have a certain curvature. In this case, the curvature may be smaller than that in the folded state.

According to certain embodiments, the first side member 113 may include a plurality of first conductive areas and a plurality of second conductive areas that are physically or electrically separated from each other. First non-conductive areas 251 may be disposed between the plurality of first conductive areas and the plurality of second conductive areas. According to certain embodiments, the second side member 123 may include a plurality of third conductive areas and a plurality of fourth conductive areas that are physically or electrically separated from each other. Second non-conductive areas 252 may be disposed between the plurality of third conductive areas and the plurality of fourth conductive areas.

According to certain embodiments, the first conductive areas and the third conductive areas may be symmetrically formed with respect to the hinge (e.g., the hinge 164 of FIG. 3). The second conductive areas and the fourth conductive areas may be symmetrically formed with respect to the hinge (e.g., the hinge 164 of FIG. 3). The first non-conductive areas 251 and the second non-conductive areas 252 may be symmetrically formed with respect to the hinge (e.g., the hinge 164 of FIG. 3). The positions of the first non-conductive areas 251 may coincide with the positions of the second non-conductive areas 252 when the electronic device 100 is in the folded state. Accordingly, the electronic device 100 according to certain embodiments may implement an appealing appearance in design.

FIG. 3 is an exploded perspective view of the electronic device 100 according to various embodiments of the disclosure.

Referring to FIG. 3, in certain embodiments, the electronic device 100 may include the display 130, a support member assembly 160, at least one printed circuit board 170, the first housing 110, the second housing 120, the first back cover 140, and the second back cover 150. In this disclosure, the display (the display unit) 130 may be referred to as the display module or the display assembly.

The display 130 may include a display panel 131 (e.g., a flexible display panel) and at least one plate 132 or layer on which the display panel 131 is seated. In certain embodiments, the plate 132 may be disposed between the display panel 131 and the support member assembly 160. The display panel 131 may be disposed on at least a portion of one surface of the plate 132. The plate 132 may include a first plate 1321 and a second plate 1322 divided from each other with respect to the hinge 164. The plate 132 may include at least one member that cannot be folded together when the first housing 110 and the second housing 120 are rotated to a folded state and/or a flat state with respect to the hinge 164. The plate 132 may include at least one subsidiary material layer (e.g., graphite member) and/or at least one conductive plate (e.g., Cu sheet) disposed on the rear surface of the display panel 131. In certain embodiments, the plate 132 may be formed in a shape corresponding to the display panel 131. For example, a partial area of the first plate 1321 may be formed in a shape corresponding to the notch area 133 of the display panel 131.

The support member assembly 160 may include a first support member 161, a second support member 162, the hinge 164 disposed between the first support member 161 and the second support member 162, the hinge cover 165 covering the hinge 164 when the hinge 164 is viewed from the outside, and at least one wiring member 163 (e.g., a flexible printed circuit board (FPCB)) across the first support member 161 and the second support member 162.

In certain embodiments, the support member assembly 160 may be disposed between the plate 132 and the at least one printed circuit board 170. For example, the first support member 161 may be disposed between the first area 131a of the display 130 and a first printed circuit board 171. The second support member 162 may be disposed between the second area 131b of the display 130 and a second printed circuit board 172.

In certain embodiments, at least a portion of the wiring member 163 and at least a portion of the hinge 164 may be disposed inside the support member assembly 160. The wiring member 163 may be disposed in a direction (e.g., the x-axis direction) across the first support member 161 and the second support member 162. The wiring member 163 may be disposed in a direction (e.g., the x-axis direction) perpendicular to a folding axis of the third area 131c (e.g., the y-axis or the folding axis F of FIG. 1).

In certain embodiments, the at least one printed circuit board 170, as mentioned above, may include the first printed circuit board 171 disposed on one side of the first support member 161 and the second printed circuit board 172 disposed on one side of the second support member 162. The first printed circuit board 171 and the second printed circuit board 172 may be disposed in the space formed by the support member assembly 160, the first housing 110, the second housing 120, the first back cover 140, and the second back cover 150. Components for implementing various functions of the electronic device 100 may be mounted on the first printed circuit board 171 and the second printed circuit board 172.

In certain embodiments, the first housing 110 may contain the first printed circuit board 171, a battery 119, at least one sensor module 181, or at least one camera module 182 that is disposed in the space formed through the first support member 161. The first housing 110 may include a glass window 183 disposed in a position corresponding to the notch area 133 of the display 130 to protect the at least one sensor module 181 and the at least one camera module 182. In certain embodiments, the second housing 120 may contain the second printed circuit board 172 disposed in the space formed through the second support member 162. According to certain embodiments, the first housing 110 may be integrally formed with the first support member 161. According to certain embodiments, the second housing 120 may also be integrally formed with the second support member 162. According to certain embodiments, the sub-display 152 may be disposed on at least a portion of the second housing 120. According to certain embodiments, the sub-display 152 may be visible from the outside through at least a partial area of the second back cover 150.

In certain embodiments, the first housing 110 may include a first rotation support surface 114, and the second housing 120 may include a second rotation support surface 124 corresponding to the first rotation support surface 114. The first rotation support surface 114 and the second rotation support surface 124 may include a curved surface corresponding to the curved surface included in the hinge cover 165.

In certain embodiments, when the electronic device 100 is in a flat state (e.g., the state of FIG. 1), the first rotation support surface 114 and the second rotation support surface 124 may cover the hinge cover 165 such that the hinge cover 165 is not exposed, or is minimally exposed, on the rear surface of the electronic device 100. In certain embodiments, when the electronic device 100 is in a folded state (e.g., the state of FIG. 2), the first rotation support surface 114 and the second rotation support surface 124 may rotate along the curved surface included in the hinge cover 165 such that the hinge cover 165 is maximally exposed on the rear surface of the electronic device 100.

According to certain embodiments, the foldable electronic device 100 may be folded in at least one of an in-folding manner, an out-folding manner, and an in/out-folding manner. The in-folding manner may be a manner of folding the display 130 inward such that the areas 131*a* and 131*b* of the display 130 face each other, the out-folding manner may be a manner of folding the display 130 outward such that the plurality of housings face each other, and the in/out-folding manner may be a manner of folding one portion of the display 130 outward and folding another portion of the display 130 inward. Hereinafter, a foldable electronic device of an in-folding type in which a display 130 is folded inward will be described as an example.

Figure 4:
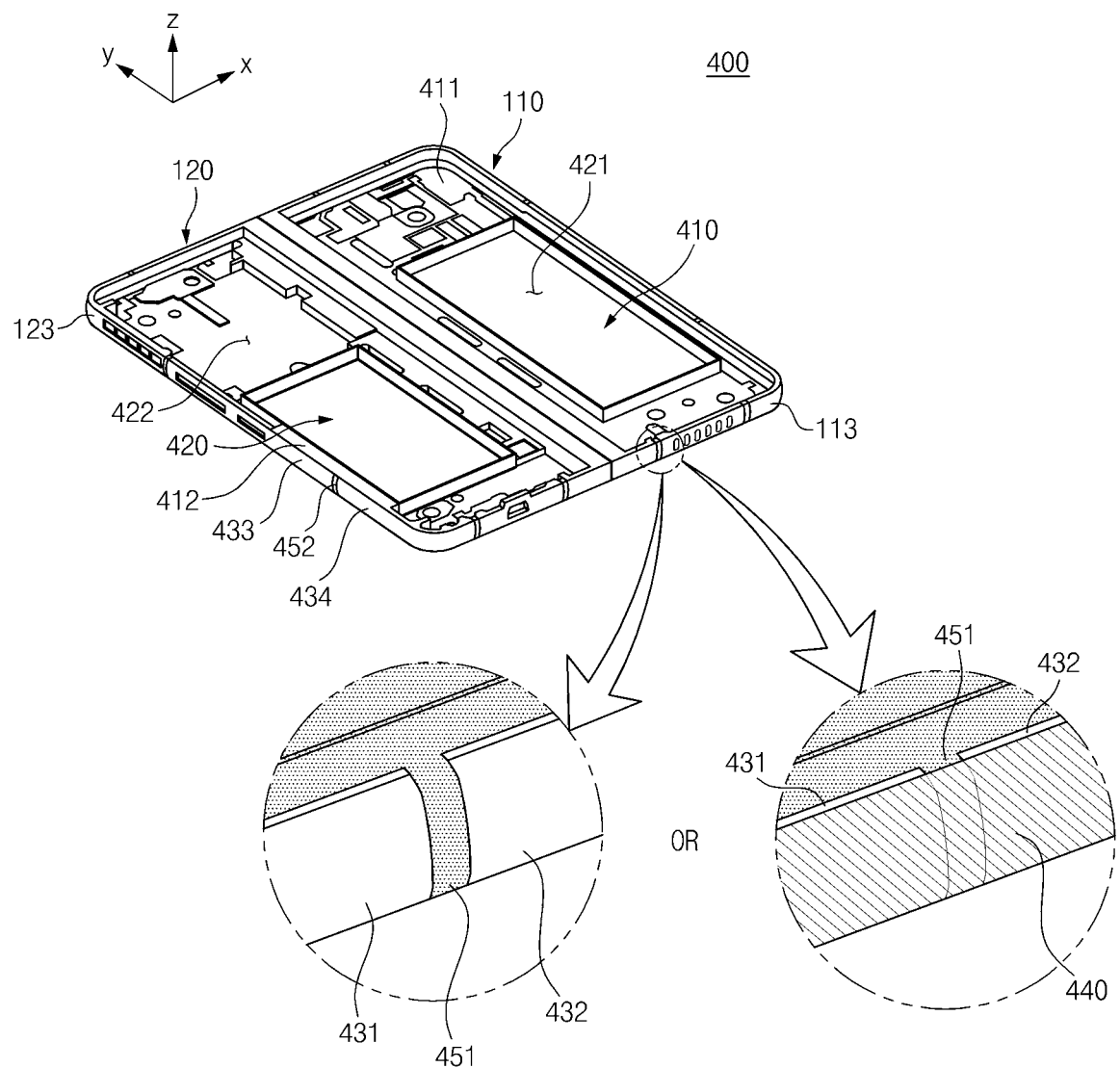
FIG. 4 is a perspective view illustrating an electronic device including side members and support members according to various embodiments.

FIG. 4 is a perspective view illustrating the electronic device including side members and support members according to various embodiments.

Referring to FIG. 4, the foldable electronic device according to various embodiments may include a first side member 113, a second side member 123, a first support member 421, and a second support member 422. The first side member 113 may be disposed to surround a first inner space 410. The second side member 123 may be disposed to surround a second inner space 420. The first side member 113 may be integrated with the first support member 421 and may be included in a first housing (e.g., the first housing 110 of FIG. 1). The second side member 123 may be integrated with the second support member 422 and may be included in a second housing (e.g., the second housing 120 of FIGS. 1 to 3).

Hereinafter, for convenience of description, the first side member 113 and the first support member 421 will be mainly described, and the description may be applied to the second side member 123 and the second support member 422. Description of the first support member 421 including a first polymer portion 411 in at least a partial area thereof may be applied to description of the second support member 422 including a second polymer portion 412 in at least a partial area thereof. The first support member 421 and the second support member 422 may be formed in the same shape or a symmetrical shape and/or may be formed of the same material. However, the first support member 421 and the second support member 422 are not limited thereto. For example, description of the second support member 422 may be applied to description of the first support member 421, but the shapes may differ from each other. Furthermore, descriptions of a first conductive area 431, a second conductive area 432, and a first non-conductive area 451 of the first side member 113 may be applied to descriptions of a third conductive area 433, a fourth conductive area 434, and a second non-conductive area 452 of the second side member 123. The first conductive area 431, the second conductive area 432, and the first non-conductive area 451 of the first side member 113 and the third conductive area 433, the fourth conductive area 434, and the second non-conductive area 452 of the second side member 123 may be formed in the same shapes or symmetrical shapes and/or may be formed of the same materials, but are not limited thereto.

The first support member 421 may extend from the first side member 113 toward the first inner space 410. According to certain embodiments, at least a partial area of the first support member 421 may be formed of a conductive material (e.g., a metal member) extending from the first side member 113 made of a conductive material, and another partial area may be formed of the first polymer portion 411 (e.g., a synthetic resin). According to certain embodiments, at least a partial area of the first support member 421 formed of a conductive material may be formed of a separate structure electrically insulated from the first side member 113 through the first polymer portion 411 of the first support member 421 (e.g., an island type).

The first side member 113 may include the first conductive area 431 and the second conductive area 432 alternately disposed in at least a partial area thereof. The first conductive area 431 may be spaced apart from the second conductive area 432. At least one first non-conductive area 451 may be formed between the first conductive area 431 and the second conductive area 432. According to certain embodiments, the first non-conductive area 451 may extend from the first polymer portion 411 of the first support member 421. According to certain embodiments, the first non-conductive area 451 may be formed of a separate insulating material different from the first polymer portion 411 of the first support member 421. The first polymer portion 411 may be coupled with the first side member 113, and the first conductive area 431 may remain physically separated from the second conductive area 432 by the first polymer portion 411. For example, the first polymer portion 411 may be formed by insert molding in a form coupled with the first side member 113.

According to certain embodiments, the first non-conductive area 451 and the second non-conductive area 452 may be exposed on the exterior of the electronic device 400 together with the first conductive area 431, the second conductive area 432, the third conductive area 433, and the fourth conductive area 434. In certain embodiments, the first non-conductive area 451 and the second non-conductive area 452 may be disposed so as not to be visible to naked eyes through opaque paint 440 applied to substantially the entire first and second side members 113 and 123.

Figure 5:
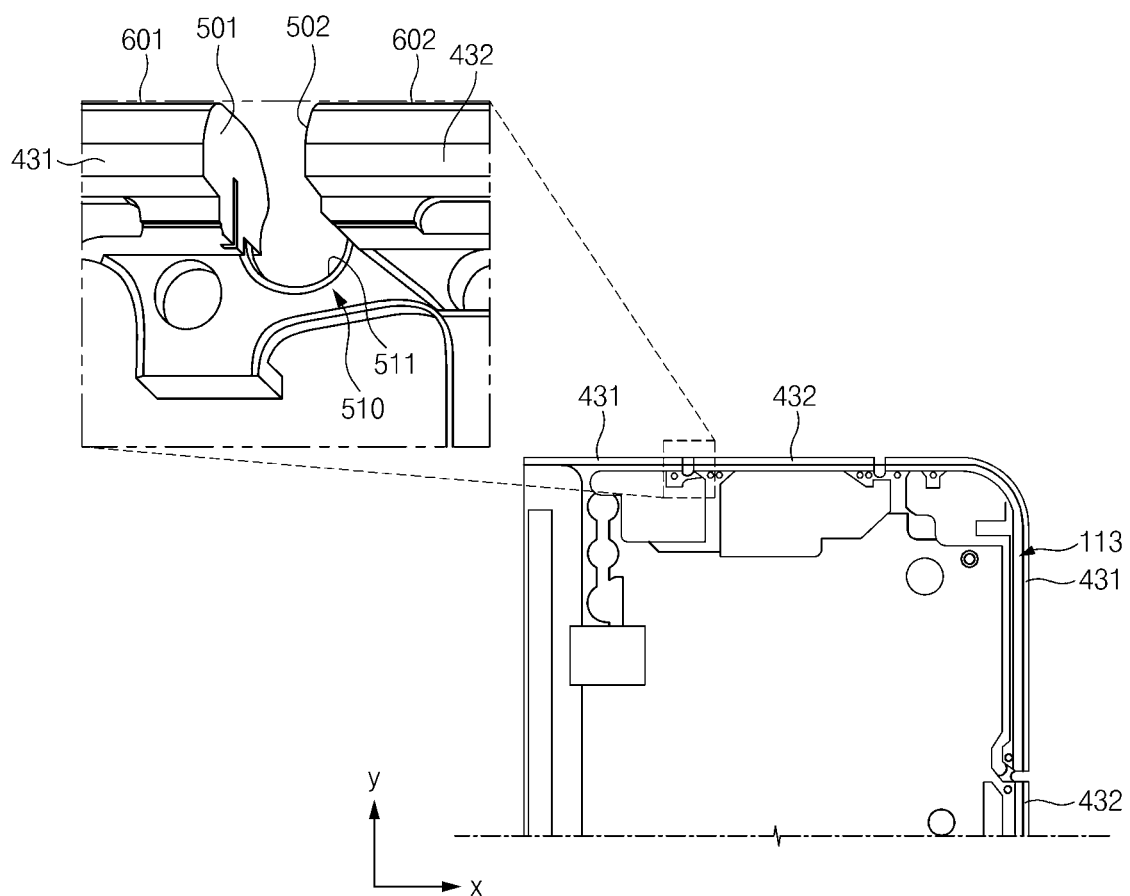
FIG. 5 is a view illustrating a partial area of a side member having a bridge member included in the electronic device according to various embodiments.
Figure 6:
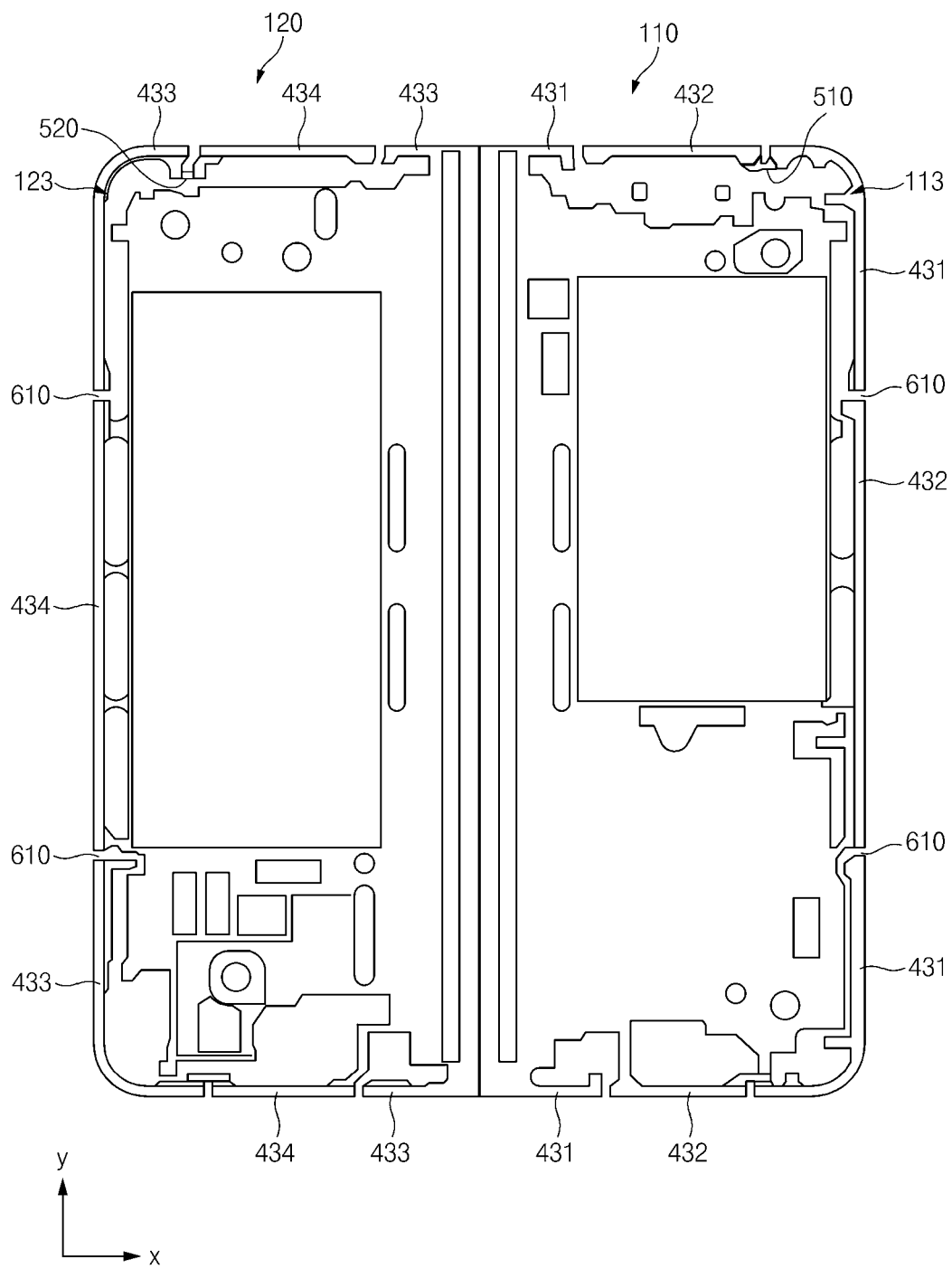
FIG. 6 is a view illustrating the side member to which the bridge member illustrated in FIG. 5 is applied.

FIG. 5 is a view illustrating a partial area of a side member having a bridge member included in the electronic device according to various embodiments, and FIG. 6 is a view illustrating the side member to which the bridge member illustrated in FIG. 5 is applied. Hereinafter, for convenience of description, the first side member 113 will be mainly described, and the description may be applied to the second side member 123. The description of the first side member 113 may be applied to description of the second side member 123. Descriptions of the first conductive area 431, the second conductive area 432, and a first bridge member 510 of the first side member 113 may be applied to descriptions of the third conductive area 433, the fourth conductive area 434, and a second bridge member 520 of the second side member 123.

Referring to FIGS. 5 and 6, the first conductive area 431, the second conductive area 432, and the first bridge member 510 may be formed in at least a partial area of the first side member 113. The first conductive area 431 may be disposed to alternate with the second conductive area 432. The first conductive area 431 may be formed of metal that is the same as, or different from, that of the second conductive area 432.

The first conductive area 431 may have a first outer surface 601 exposed on the exterior of the electronic device (e.g., the electronic device 400 of FIG. 4) and a first inner surface 501 that meets the first outer surface 601 at a substantially right angle to form a corner. The first outer surface 601 may face away from the first inner space (e.g., the first inner space 410 of FIG. 4) and the second inner space (e.g., the second inner space 420 of FIG. 4). The second conductive area 432 may have a second outer surface 602 exposed on the exterior of the electronic device and a second inner surface 502 that meets the second outer surface 602 at a substantially right angle to form a corner. The first inner surface 501 may be spaced apart from the second inner surface 502 by a predetermined gap and may be disposed to face each other.

The first bridge member 510 may be disposed between the first conductive area 431 and the second conductive area 432 and may electrically connect the first conductive area 431 and the second conductive area 432. According to certain embodiments, the first bridge member 510 may be formed of the same material as at least one of the first conductive area 431 and the second conductive area 432. For example, the first bridge member 510 may be formed of the same material as the first conductive area 431 or the second conductive area 432 and may be integrated with the first conductive area 431 or the second conductive area 432. According to certain embodiments, the first bridge member 510 may be formed of a metallic material different from those of the first conductive area 431 and the second conductive area 432. For example, the first bridge member may be formed of a material having a higher elastic force than the first conductive area 431 and the second conductive area 432. The first bridge member 510 may be coupled with the first conductive area 431 and the second conductive area 432 through welding, an adhesive, or a mechanical part such as a screw.

According to certain embodiments, at least a partial area of the first bridge member 510 may be formed to be a first inside surface 511 having a curvature. At least a partial area of the surface of the first bridge member 510 that faces toward the space between the first conductive area 431 and the second conductive area 432 facing each other may be formed to be the first inside surface 511. The first inside surface 511 of the first bridge member 510 may be concavely formed toward the space between the first conductive area 431 and the second conductive area 432 facing each other. For example, the first bridge member 510 may be formed in the shape of "U" to bypass the space between the first inner surface 501 of the first conductive area 431 and the second inner surface 502 of the second conductive area 432.

According to certain embodiments, as illustrated in FIG. 6, at least a portion of at least one of the first conductive area 431 and the second conductive area 432 may be segmented as a unit conductive area by a slit 610 disposed in at least a portion of the first side member 113. The segmented conductive areas 431 and 432 may be electrically connected with a wireless communication circuit disposed on a printed circuit board (e.g., the printed circuit board 170 of FIG. 3) and may be used as antennas.

According to certain embodiments, when the electronic device is in a folded state, the first conductive area 431 segmented as a unit conductive area may overlap the third conductive area 433 segmented as a unit conductive area. When the electronic device is in the folded state, the second conductive area 432 segmented as a unit conductive area may overlap the fourth conductive area 434 segmented as a unit conductive area.

Figure 7:
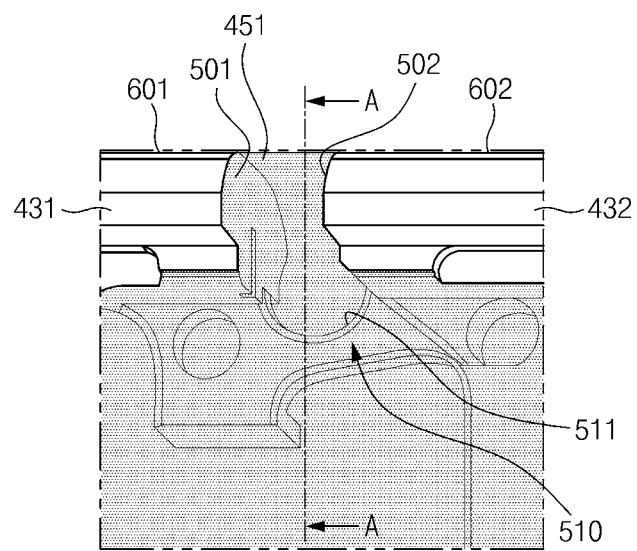
FIG. 7 is a view illustrating a partial area of at least one of a first side member and a second side member included in the electronic device according to various embodiments.
Figure 8:
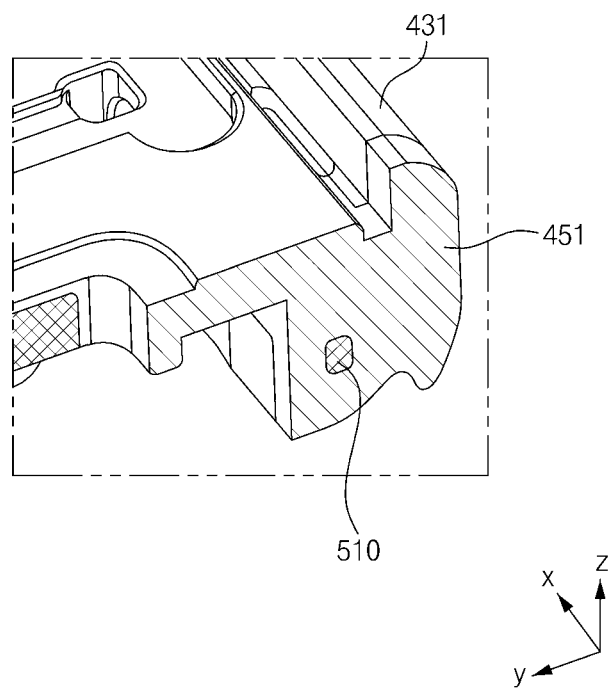
FIG. 8 is a partial sectional view of at least one of the first side member and the second side member taken along line A-A' in FIG. 7.

FIG. 7 is a view illustrating a partial area of at least one of the first side member and the second side member included in the electronic device according to various embodiments, and FIG. 8 is a partial sectional view of at least one of the first side member and the second side member taken along line A-A' in FIG. 7. Hereinafter, for convenience of description, the first side member 113 will be mainly described, and the description may be applied to the second side member 123. The description of the first side member 113 may be applied to description of the second side member 123. Furthermore, descriptions of the first conductive area 431, the second conductive area 432, the first non-conductive area 451, and the first bridge member 510 of the first side member 113 may be applied to descriptions of the third conductive area 433, the fourth conductive area 434, the second non-conductive area 452, and the second bridge member 520 of the second side member 123.

Referring to FIGS. 7 and 8, the first non-conductive area 451 may be disposed between the first conductive area 431, the second conductive area 432, and the first bridge member 510. The first non-conductive area 451 may be formed to make contact with the first inner surface 501 of the first conductive area 431, the second inner surface 502 of the second conductive area 432, and the first inside surface 511 of the first bridge member 510. The front surface (e.g., the surface facing the +Z-axis direction) of the first non-conductive area 451 that meets the first inner surface 501 and the second inner surface 502 to form corners may form a plane with the front surface (e.g., the surface facing the +Z-axis direction) of the first conductive area 431 and the front surface (e.g., the surface facing the +Z-axis direction) of the second conductive area 432.

According to certain embodiments, the first bridge member 510 may be formed to have a thickness smaller than or equal to the thickness of at least one of the first conductive area 431 and the second conductive area 432. For example, the first bridge member 510 may be formed to be thinner than the first conductive area 431 and the second conductive area 432.

At least a portion of the first bridge member 510 may be disposed inside the first non-conductive area 451. For example, the first bridge member 510 may be surrounded by the first non-conductive area 451. In another example, a portion of the first bridge member 510 may be surrounded by the first non-conductive area 451, and the remaining portion may not be surrounded by the first non-conductive area 451.

Figure 9A:
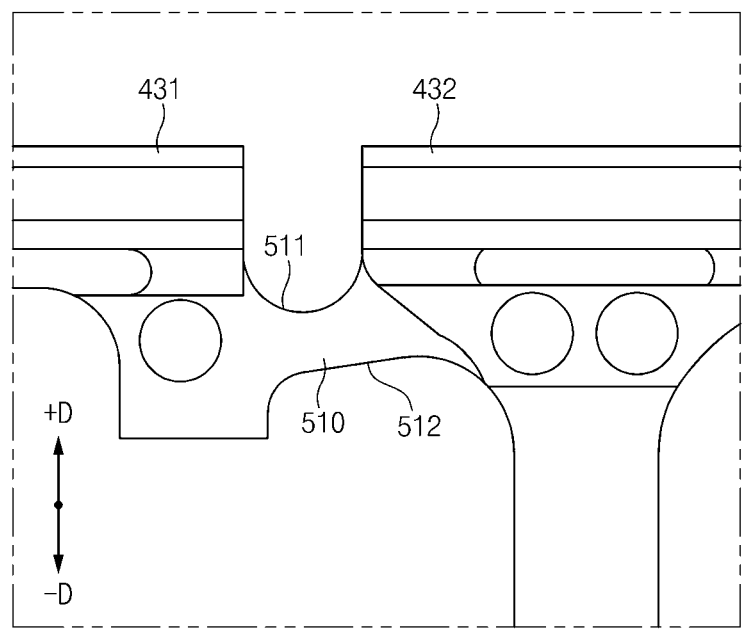
FIGS. 9A and 9B are views illustrating various embodiments of a first bridge member of the electronic device according to various embodiments.
Figure 9B:
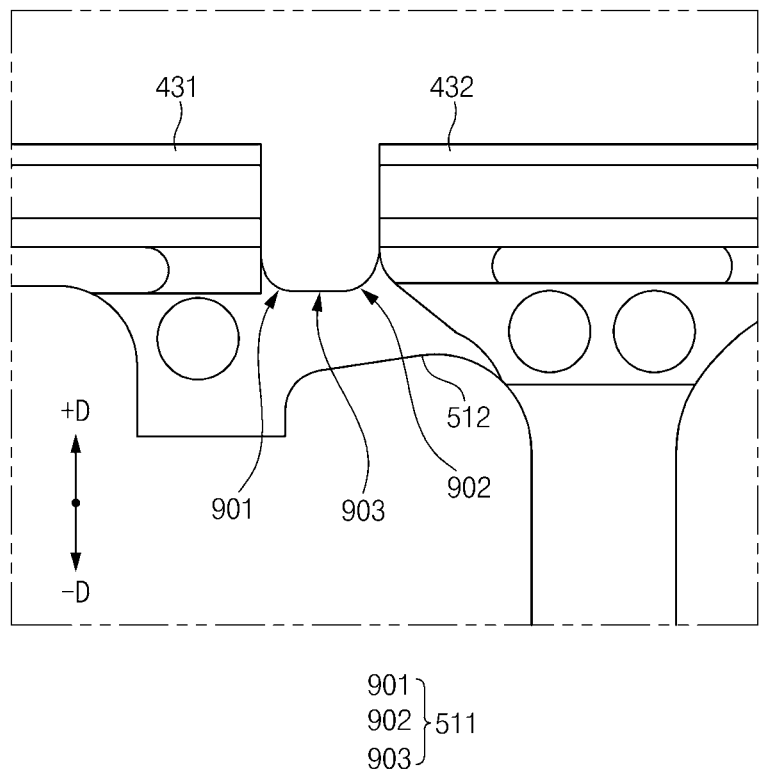

FIGS. 9A and 9B are views illustrating various embodiments of the first bridge member of the electronic device according to various embodiments. Hereinafter, description of the first bridge member may be applied to description of the second bridge member.

Referring to FIGS. 9A and 9B, the first bridge member 510 may include the first inside surface 511 facing toward the outside of the electronic device and a second inside surface 512 facing toward the inside of the electronic device.

At least one of the first inside surface 511 and the second inside surface 512 may be formed of at least one curved surface having a predetermined curvature. For example, at least a partial area of at least one of the first inside surface 511 and the second inside surface 512 may be formed of one curved surface having a curvature of 0.3R to 1.0R.

According to certain embodiments, the first inside surface 511 may be formed of a curved surface that is concave in a first direction (e.g., a +D direction) toward the outside of the electronic device. According to certain embodiments, the first inside surface 511 may be formed of a curved surface that is concave in the first direction, and the second inside surface 512 may be formed of a curved surface that is concave or convex in a second direction (e.g., a −D direction) opposite to the first direction. For example, as illustrated in FIG. 9A, the first inside surface 511 may be formed of one curved surface that is concavely recessed in the first direction. For example, the first inside surface 511 may be formed of one curved surface having a curvature of 0.3R to 1.0R.

According to certain embodiments, as illustrated in FIG. 9B, the first inside surface 511 may include at least two curved areas 901 and 902 and a flat area 903. The flat area 903 may be disposed between the first curved area 901 and the second curved area 902 so as to be substantially perpendicular to the first direction. The first curved area 901 may be formed to be concave in the first direction between the first conductive area 431 and the flat area 903. The second curved area 902 may be formed to be concave in the first direction between the second conductive area 432 and the flat area 903. The first curved area 901 and the second curved area 902 may be formed to have the same curvature or different curvatures. For example, the first curved area 901 and the second curved area 902 may be formed to have a curvature of 0.3R to 1.0R.

Figure 10A:
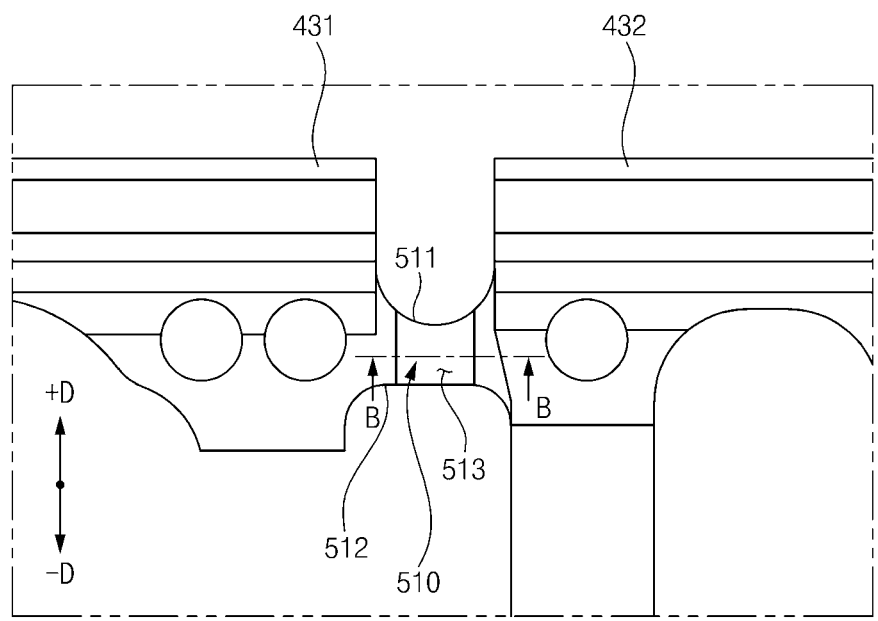
FIG. 10A is a plan view illustrating the first bridge member of the electronic device according to various embodiments.
Figure 10B:
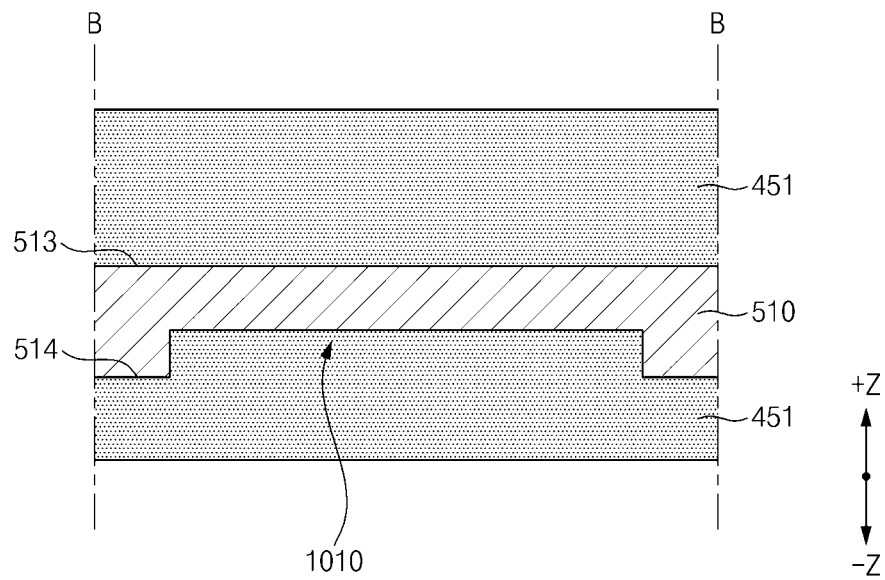
FIGS. 10B and 10C are sectional views of various embodiments of the first bridge member taken along line B-B in FIG. 10A.
Figure 10C:
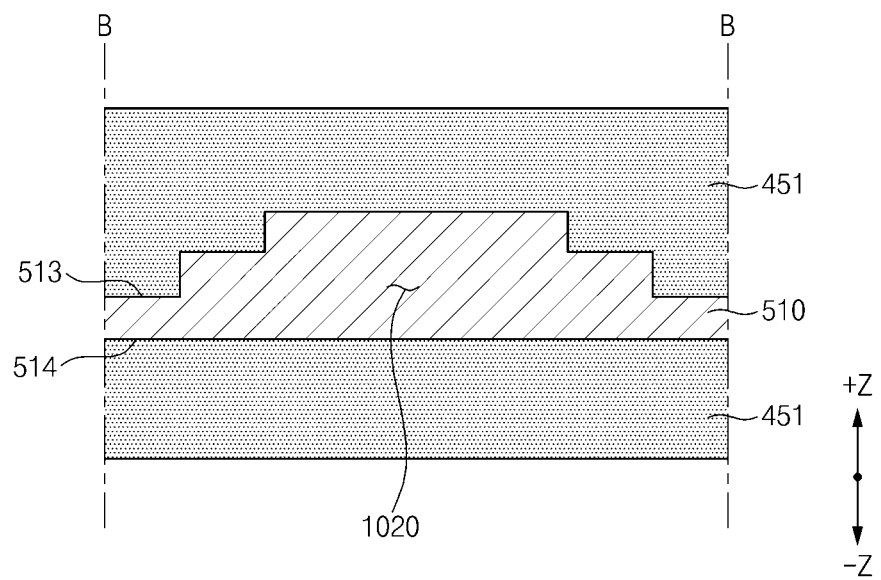

FIGS. 10A to 10C are views illustrating various embodiments of the first bridge member of the electronic device according to various embodiments. Hereinafter, description of the first bridge member may be applied to description of the second bridge member.

Referring to FIGS. 10A to 10C, the first bridge member 510 may include the first inside surface 511 facing toward the outside of the electronic device (e.g., the +D direction), the second inside surface 512 facing toward the inside of the electronic device (e.g., the −D direction), an upper surface 513 facing toward the front surface of the electronic device (e.g., the +Z direction), and a lower surface 514 facing toward the rear surface of the electronic device (e.g., the −Z direction). At least a portion of at least one of the first inside surface 511, the second inside surface 512, the upper surface 513, and the lower surface 514 of the first bridge may include at least one of a concave area 1010 and a convex area 1020.

According to certain embodiments, the first bridge member 510 illustrated in FIGS. 10A and 10B may include the concave area 1010 formed to be concave from the lower surface 514 toward the upper surface 513. For example, the cross-section of the concave area 1010 may be formed in a polygonal shape, a tapered shape, a curved shape having a curvature, or a stepped shape. The surface area of the first bridge member 510 may be increased by the concave area 1010. The first bridge member 510 including the concave area 1010 may have an increased contact area with the first non-conductive area 451. According to certain embodiments, the first bridge member 510 may include a second concave area that is formed to be concave from the upper surface 513 toward the lower surface 514.

According to certain embodiments, the first bridge member 510 illustrated in FIG. 10C may include the convex area 1020 formed to be convex from the upper surface 513 toward the front surface of the electronic device (e.g., the +Z direction). For example, the cross-section of the convex area 1020 may be formed in a polygonal shape, a tapered shape, a curved shape having a curvature, or a stepped shape. The surface area of the first bridge member 510 may be increased by the convex area 1020. The first bridge member 510 including the convex area 1020 may have an increased contact area with the first non-conductive area 451. According to certain embodiments, the first bridge member 510 may include a second convex area that is formed to be convex from the lower surface 514 toward the rear surface of the electronic device (e.g., the −Z direction).

According to various embodiments, the first bridge member 510 may be formed in a mixture of the above-described various shapes. For example, at least two of the concave area 1010, the second concave area, the convex area 1020, and the second convex area may be mixed to form the first bridge member 510.

Figure 11A:
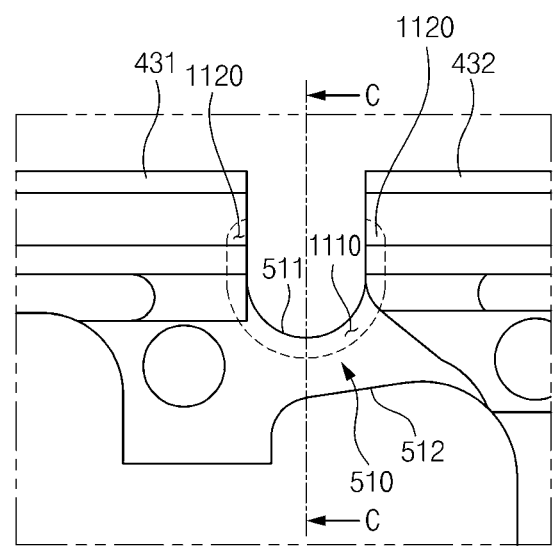
FIG. 11A is a plan view illustrating a side member of the electronic device having a plurality of inner grooves according to various embodiments.
Figure 11B:
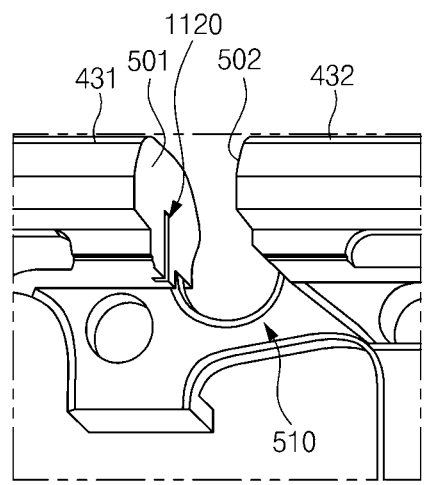
FIG. 11B is a view for describing a second inner groove included in a first conductive area illustrated in FIG. 11A.
Figure 11C:
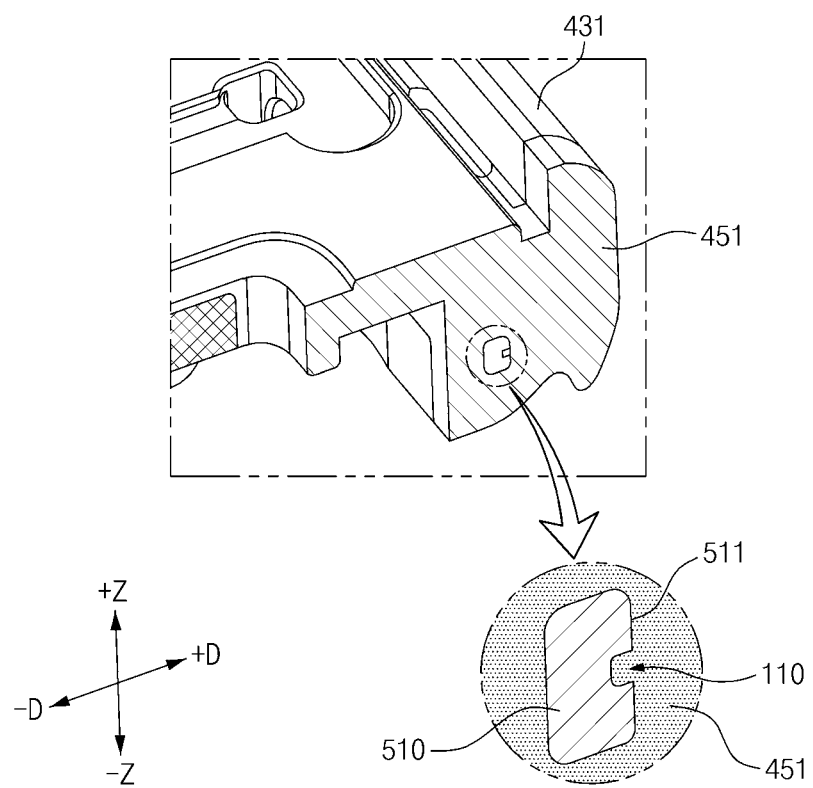
FIG. 11C is a view of the side member taken along line C-C in FIG. 11A, where the first bridge member and a first non-conductive area are coupled to the side member.

FIG. 11A is a plan view illustrating a side member of the electronic device having a plurality of inner grooves according to various embodiments, FIG. 11B is a view for describing a second inner groove included in the first conductive area illustrated in FIG. 11A, and FIG. 11C is a view of the side member taken along line C-C in FIG. 11A, where the first bridge member and the first non-conductive area are coupled to the side member. Hereinafter, description of the first bridge member may be applied to description of the second bridge member.

Referring to FIGS. 11A to 11C, the first bridge member 510 may include at least one first inner groove 1110. The first inner groove 1110 may be formed to have a depth from the first inside surface 511 of the first bridge member 510 in a direction perpendicular to the direction toward the front surface of the electronic device (e.g., the +Z direction). A portion of the first non-conductive area 451 may be introduced into the first inner groove 1110, and thus the contact area between the first non-conductive area 451 and the first bridge member 510 may be increased.

A second inner groove 1120 may be formed in at least one of the first conductive area 431 and the second conductive area 432 connected by the first bridge member 510. The second inner groove 1120 may be formed to have a depth from at least one of the first inner surface 501 and the second inner surface 502 in a direction perpendicular to the direction toward the front surface of the electronic device (e.g., the +Z direction). The second inner groove 1120 may be connected with the first inner groove 1110, or may be staggered with respect to the first inner groove 1110 so as not be connected with the first inner groove 1110.

According to certain embodiments, at least one of the first inner groove 1110 and the second inner groove 1120 may be formed by using a T-cutter or other machining tools.

According to various embodiments, the first inner groove 1110 may be formed not only on the first inside surface 511 of the first bridge member 510 but also on at least a portion of the second inside surface 512 of the first bridge member 510. The first inner groove 1110 formed on the first inside surface 511 and the first inner groove 1110 formed on the second inside surface 512 may be formed to be spaced apart from each other, or may be formed to be at least partially connected with each other.

Figure 12:
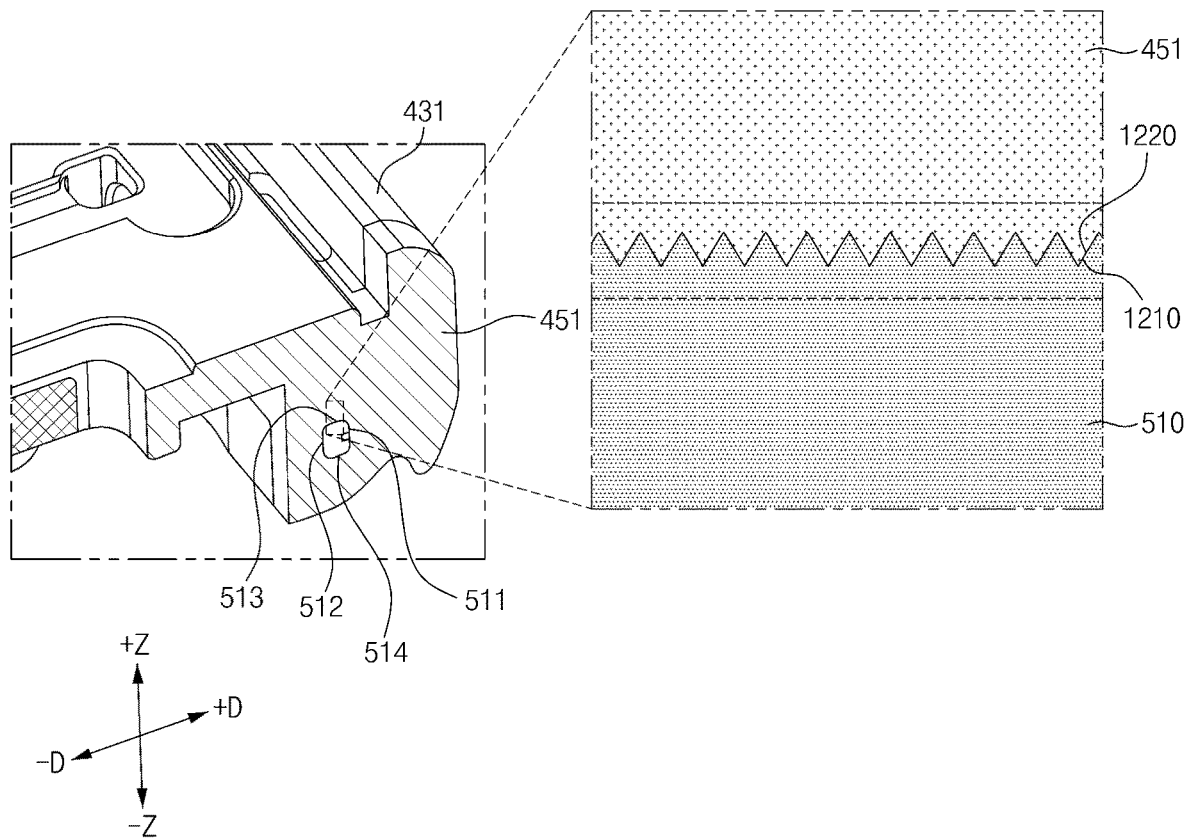
FIG. 12 is a view for describing a coupling relationship between the first bridge member and the first non-conductive area according to various embodiments.

FIG. 12 is a view for describing a coupling relationship between the first bridge member and the first non-conductive area according to various embodiments. Hereinafter, description of the first bridge member may be applied to description of the second bridge member.

Referring to FIG. 12, the first bridge member 510 may include the first inside surface 511 facing toward the outside of the electronic device (e.g., the +D direction), the second inside surface 512 facing toward the inside of the electronic device (e.g., the −D direction), the upper surface 513 facing toward the front surface of the electronic device (e.g., the +Z direction), and the lower surface 514 facing toward the rear surface of the electronic device (e.g., the −Z direction). At least a portion of at least one of the first inside surface 511, the second inside surface 512, the upper surface 513, and the lower surface 514 of the first bridge member 510 may be formed in a concave-convex shape. At least a portion of the first inside surface 511, the second inside surface 512, the upper surface 513, or the lower surface 514 that makes contact with the first non-conductive area 451 may be formed to include a first bumpy structure 1210. Recessed portions and raised portions included in the first bumpy structure 1210 may be regularly or irregularly arranged. According to certain embodiments, the first bumpy structure 1210 may be formed by surface-treating the first inside surface 511, the second inside surface 512, the upper surface 513, or the lower surface 514 of the first bridge member 510 through chemical processing, such as an etching process, or laser processing.

The first non-conductive area 451 surrounding the first bridge member 510 may be formed such that at least a portion of a surface making contact with the first bridge member 510 includes a second bumpy structure 1220. Recessed portions and raised portions included in the second bumpy structure 1220 may be regularly or irregularly arranged. The second bumpy structure 1220 of the first non-conductive area 451 may be coupled to be engaged with the first bumpy structure 1210 of the first bridge member 510. The recessed portions of the first bumpy structure 1210 of the first bridge member 510 may be coupled with the raised portions of the second bumpy structure 1220, and the raised portions of the first bumpy structure 1210 may be coupled with the recessed portions of the second bumpy structure 1220.

The contact area between the first bridge member 510 and the first non-conductive area 451 may be increased by the first bumpy structure 1210 and the second bumpy structure 1220. Accordingly, the first bridge member 510 and the first non-conductive area 451 may be stably coupled through the first bumpy structure 1210 and the second bumpy structure 1220.

Figure 13A:
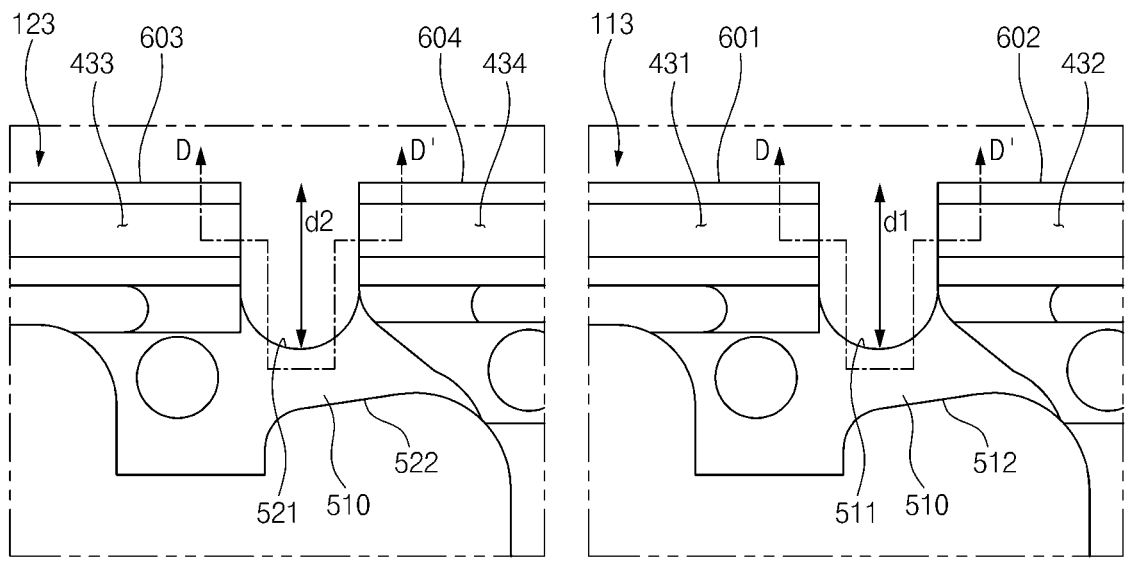
FIG. 13A is a plan view illustrating the first side member and the second side member in a flat state of the electronic device according to various embodiments.
Figure 13B:
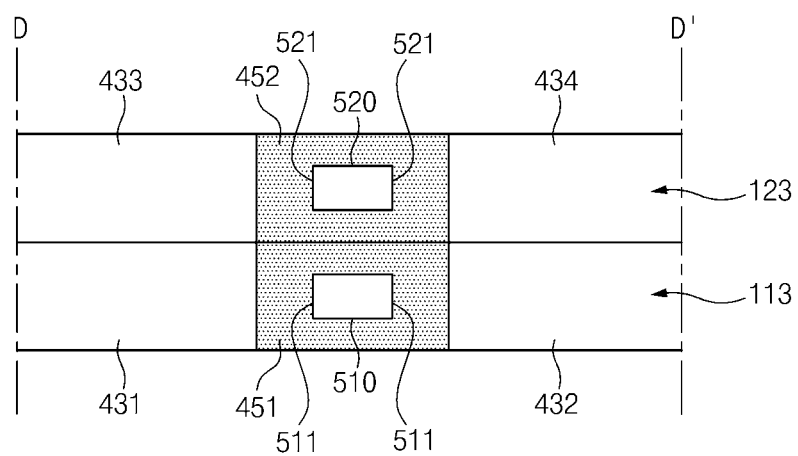
FIG. 13B is a sectional view taken along line D-D' in FIG. 13A, where
Figure 14A:
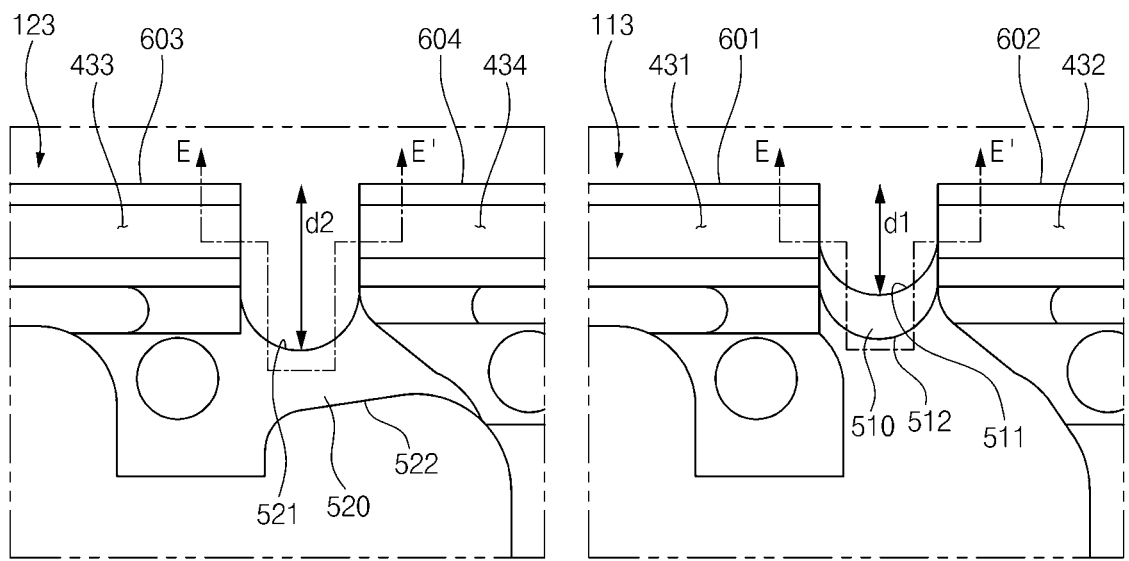
FIG. 14A is a plan view illustrating the first side member and the second side member in a flat state of the electronic device according to various embodiments.
Figure 14B:
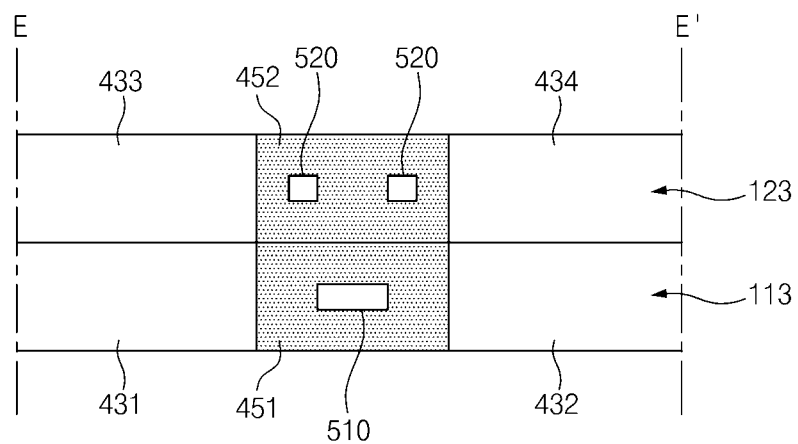
FIG. 14B is a sectional view taken along line E-E' in FIG. 14A, where

FIG. 13A is a plan view illustrating the first side member and the second side member in a flat state of the electronic device according to various embodiments, and FIG. 13B is a sectional view taken along line D-D' in FIG. 13A, where FIG. 13B illustrates a closed state of the electronic device in which the first side member and the second side member are coupled. FIG. 14A is a plan view illustrating the first side member and the second side member in a flat state of the electronic device according to various embodiments, and FIG. 14B is a sectional view taken along line E-E' in FIG. 14A, where FIG. 14B illustrates a closed state of the electronic device in which the first side member and the second side member are coupled.

Referring to FIGS. 13A to 14B, the first side member 113 of the electronic device according to various embodiments may include the first bridge member 510, the first conductive area 431, the second conductive area 432, and the first non-conductive area 451. The second side member 123 may include the second bridge member 520, the third conductive area 433, the fourth conductive area 434, and the second non-conductive area 452.

The first side member 113 and the second side member 123 may be disposed to face each other in a folded state of the electronic device. For example, in the folded state of the electronic device, the first conductive area 431 of the first side member 113 and the third conductive area 433 of the second side member 123 may face each other. The second conductive area 432 of the first side member 113 and the fourth conductive area 434 of the second side member 123 may face each other. The first non-conductive area 451 of the first side member 113 and the second non-conductive area 452 of the second side member 123 may face each other.

According to certain embodiments, as illustrated in FIGS. 13A and 13B, in the folded state of the electronic device, at least a portion of the first bridge member 510 may match at least a portion of the second bridge member 520. For example, the first bridge member 510 and the second bridge member 520 may be disposed to completely overlap each other. The separation distance d1 between the first inside surface 511 of the first bridge member 510 and the first outer surface 601 of the first conductive area 431 or the second outer surface 602 of the second conductive area 432 may be equal to the separation distance d1 between a third inside surface 521 of the second bridge member 520 and a third outer surface 603 of the third conductive area 433 or a fourth outer surface 604 of the fourth conductive area 434. The first inside surface 511 of the first bridge member 510 and the third inside surface 521 of the second bridge member 520 may be aligned on the same virtual vertical line, and the second inside surface 512 of the first bridge member 510 and a fourth inside surface 522 of the second bridge member 520 may be aligned on the same virtual vertical line. In another example, in the folded state of the electronic device, the first bridge member 510 and the second bridge member 520 may be disposed to partially overlap each other. The first inside surface 511 of the first bridge member 510 and the third inside surface 521 of the second bridge member 520 may be aligned within an error range in a manufacturing process. The second inside surface 512 of the first bridge member 510 and the fourth inside surface 522 of the second bridge member 520 may be aligned within an error range in a manufacturing process. Accordingly, in the folded state of the electronic device, the first bridge member 510, together with the second bridge member 520, may disperse an external impact to prevent damage to the first non-conductive area 451 and the second non-conductive area 452.

According to certain embodiments, as illustrated in FIGS. 14A and 14B, in the folded state of the electronic device, the first bridge member 510 may not face the second bridge member 520. The separation distance d1 between the first inside surface 511 of the first bridge member 510 and the first outer surface 601 of the first conductive area 431 or the second outer surface 602 of the second conductive area 432 may differ from the separation distance d2 between the third inside surface 521 of the second bridge member 520 and the third outer surface 603 of the third conductive area 433 or the fourth outer surface 604 of the fourth conductive area 434. One of the first inside surface 511 of the first bridge member 510 and the third inside surface 521 of the second bridge member 520 may be disposed closer to the first outer surface 601 and the second outer surface 602 than the other one of the first inside surface 511 and the third inside surface 521. One of the second inside surface 512 of the first bridge member 510 and the fourth inside surface 522 of the second bridge member 520 may be disposed closer to the first outer surface 601 and the second outer surface 602 than the other one of the second inside surface 512 and the fourth inside surface 522. The first bridge member 510 and the second bridge member 520 may be staggered with respect to each other without overlapping each other. Accordingly, in the folded state of the electronic device, an electro-magnetic coupling phenomenon between the first bridge member 510 and the second bridge member 520 may be reduced, and thus antenna radiation efficiency may be secured.

Figure 15:
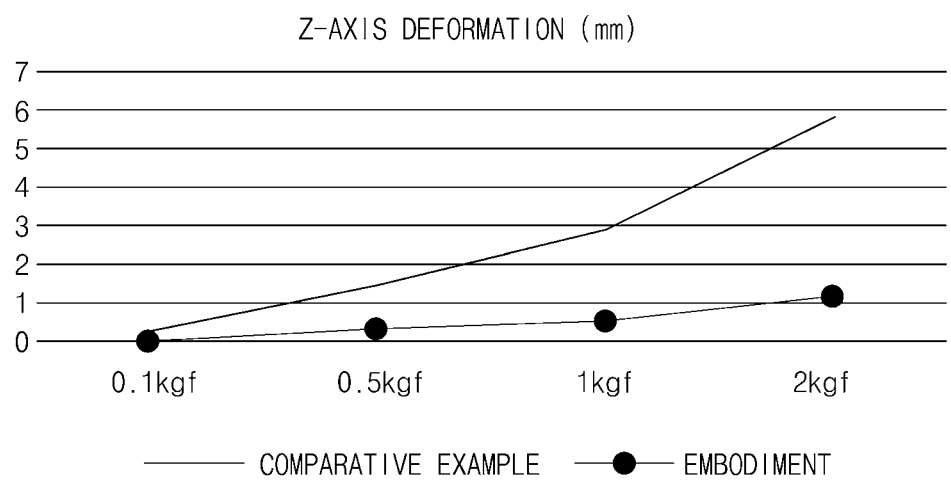
FIG. 15 is a graph depicting deformation of the electronic device according to various embodiments.
Figure 16:
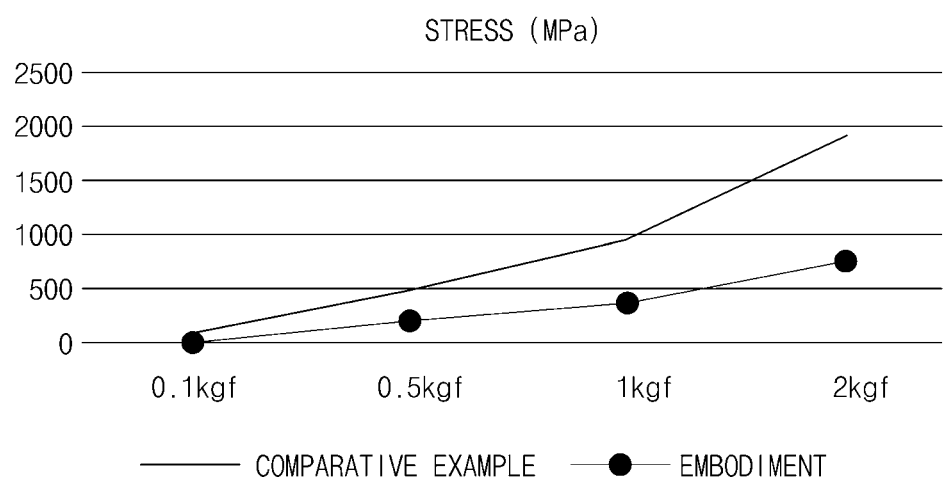
FIG. 16 is a graph depicting stress of the electronic device according to various embodiments.

FIGS. 15 and 16 are graphs depicting stiffness performance of the electronic device according to various embodiments.

A comparative example may correspond to a foldable electronic device not including a bridge member, and certain embodiments may correspond to a foldable electronic device 100 including bridge members 510 and 520.

An impact (load) of 0.1 kgf to 2 kgf may be applied to a corner of the foldable electronic device according to the comparative example and a corner of the foldable electronic device according to the embodiment. It can be seen that as the foldable electronic device according to the comparative example does not include the bridge members 510 and 520, the electronic device has relatively large deformation and relatively high maximum stress as illustrated in FIGS. 15 and 16. In contrast, as the foldable electronic device 100 according to the embodiment includes the bridge members 510 and 520, the deformation of the electronic device 100 may be reduced to ⅕ of that in the comparative example as illustrated in FIG. 15. It can be seen that, as illustrated in FIG. 16, the maximum stress of the foldable electronic device 100 according to the embodiment is reduced to ⅓ of that in the comparative example.

An electronic device according to various embodiments of the disclosure may include a first housing 110 including a first side member that surrounds a first inner space disposed on one side of a hinge, a second housing 120 including a second side member that surrounds a second inner space disposed on an opposite side of the hinge from the side that the first side member is disposed, and a display, at least a portion of which is folded, the display disposed in a space provided by the first housing and the second housing. At least one of the first side member 113 and the second side member 123 may include a plurality of conductive areas 431, 432, 433, and 434 spaced apart from each other, at least one non-conductive area 451 or 452 disposed between the plurality of conductive areas to bond the plurality of conductive areas, and at least one bridge member 510 or 520 that connects at least two of the plurality of conductive areas and that is at least partially surrounded by the at least one non-conductive area.

According to various embodiments, one of the plurality of conductive areas may include a first outer surface 601 that faces a first direction away from the first inner space and the second inner space and a first inner surface 501 that forms a corner with the first outer surface, and another one of the plurality of conductive areas may include a second outer surface 602 that faces the first direction the same as the first outer surface and a second inner surface 502 that faces the first inner surface and forms a corner with the second outer surface.

According to various embodiments, the at least one bridge member may include a first inside surface 511 that faces the first direction and connects the first inner surface and the second inner surface, a second inside surface 512 that faces a second direction opposite to the first direction, an upper surface 513 that forms a corner with the first inside surface and faces toward the display, and a lower surface 514 that forms a corner with the first inside surface and faces away from the display.

According to various embodiments, the first inside surface may include at least one curved area concavely formed in the first direction.

According to various embodiments, the first inside surface may include a first curved area connected with the first inner surface, a second curved area connected with the second inner surface, and a flat area that is disposed between the first curved area and the second curved area and is flat toward the first direction.

According to various embodiments, the at least one bridge member may include at least one of a concave area and a convex area that makes contact with the non-conductive area.

According to various embodiments, at least one of the concave area and the convex area may be formed in a polygonal shape, a tapered shape, a curved shape having a curvature, or a stepped shape.

According to various embodiments, the at least one bridge member may include a first inner groove concavely formed in a direction opposite to the first inner space from the first inside surface.

According to various embodiments, at least one of the first inside surface, the second inside surface, the upper surface, and the lower surface that makes contact with the non-conductive area may include a bumpy structure.

According to various embodiments, the first side member may include a first conductive area 431 and a second conductive area 432 included in the plurality of conductive areas, a first non-conductive area 451 included in the at least one non-conductive area and disposed between the first conductive area and the second conductive area to bond the first conductive area and the second conductive area, and a first bridge member 510 that is included in the at least one bridge member and that connects the first conductive area and the second conductive area, the first bridge member at least partially surrounded by the first non-conductive area. The second side member 123 may include a third conductive area 433 and a fourth conductive area 434 included in the plurality of conductive areas, a second non-conductive area 452 included in the at least one non-conductive area and disposed between the third conductive area and the fourth conductive area to bond the third conductive area and the fourth conductive area, and a second bridge member 520 that is included in the at least one bridge member and that connects the third conductive area and the fourth conductive area, the second bridge member at least partially surrounded by the second non-conductive area.

According to various embodiments, the first non-conductive area and the second non-conductive area may be substantially aligned in a folded state of the first housing structure and the second housing structure.

According to various embodiments, in a folded state of the electronic device, at least a portion of the first bridge member may overlap at least a portion of the second bridge member.

According to various embodiments, in a folded state of the electronic device, the first bridge member may be staggered with respect to the second bridge member.

According to various embodiments, the at least one bridge member may be formed of the same material as at least one of the plurality of conductive areas, and the non-conductive area may be formed of a polymer material.

According to various embodiments, the at least one bridge member may be formed of a metallic material having a higher elastic force than at least one of the plurality of conductive areas.

A foldable housing foldable with respect to a hinge according to various embodiments of the disclosure may include a first housing including a first side member that surrounds a first inner space disposed on a side of the hinge and a second housing including a second side member that surrounds a second inner space disposed on an opposite side of the hinge from the side that the first side member is disposed. The first side member may include a first conductive area 431 including a first inner surface 501, a second conductive area 432 including a second inner surface 502 that faces the first inner surface, a first bridge member 510 that connects the first conductive area and the second conductive area in the first inner space, and a first non-conductive area 451 disposed between the first inner surface, the second inner surface, and the first bridge member to bond the first conductive area, the second conductive area, and the first bridge member. The second side member may include a third conductive area that is symmetrical to the first conductive area with respect to the hinge and includes a third inner surface, a fourth conductive area including a fourth inner surface that faces the third inner surface, a second bridge member that connects the third conductive area and the fourth conductive area in the second inner space, and a second non-conductive area disposed between the third inner surface, the fourth inner surface, and the second bridge member to bond the third conductive area, the fourth conductive area, and the second bridge member.

According to various embodiments, at least one of the first bridge member and the second bridge member may include a first inside surface that connects the first inner surface and the second inner surface and includes at least one curved area concavely formed in a direction opposite to the inner space, a second inside surface that faces away from the first inside surface, an upper surface that forms a corner with the first inside surface and that is substantially perpendicular to the first inside surface and the second inside surface, and a lower surface that forms a corner with the first inside surface and faces away from the upper surface.

According to various embodiments, the first inside surface may include a first curved area connected with the first inner surface, a second curved area connected with the second inner surface, and a flat area that is disposed between the first curved area and the second curved area and is flat toward the first direction.

According to various embodiments, at least one of the first bridge member and the second bridge member may include, on at least one of the upper surface and the lower surface, at least one of a concave area and a convex area that makes contact with at least one of the first non-conductive area and the second non-conductive area, and at least one of the concave area and the convex area may be formed in a polygonal shape, a tapered shape, a curved shape having a curvature, or a stepped shape.

According to various embodiments, at least one of the first bridge member and the second bridge member may include a first inner groove concavely formed from the first inside surface toward at least one of the first inner space and the second inner space.

According to various embodiments, at least a partial area of at least one of the first bridge member and the second bridge member may have a concave curvature in a direction opposite to at least one of the first inner space and the second inner space.

It should be appreciated that various embodiments of the disclosure and the terms used therein are not intended to limit the technological features set forth herein to particular embodiments and include various changes, equivalents, and/or replacements for a corresponding embodiment. With regard to the description of the drawings, similar reference numerals may be used to refer to similar elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

According to the situation, the expression "adapted to or configured to" used in this disclosure may be used interchangeably with, for example, the expression "suitable for", "having the capacity to", "adapted to", "made to", "capable of", or "designed to" in hardware or software. The expression "a device configured to" may mean that the device is "capable of" operating together with another device or other components. For example, a "processor set to (or configured to) perform A, B, and C" may mean a dedicated processor (e.g., an embedded processor) for performing corresponding operations or a generic-purpose processor (e.g., a CPU or an AP) that performs corresponding operations by executing one or more programs stored in a memory device (e.g., memory).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. The "module" may be implemented mechanically or electronically and may include, for example, an application-specific integrated circuit (ASIC) chip, field-programmable gate arrays (FPGAs), or a programmable-logic device for performing some operations, which are known or will be developed.

At least a part of an apparatus (e.g., modules or functions thereof) or a method (e.g., operations) according to various embodiments may be implemented by instructions stored in computer-readable storage media (e.g., memory) in the form of a program module. The instructions, when executed by a processor (e.g., a processor), may cause the processor to perform functions corresponding to the instructions. The computer-readable storage media may include a hard disk, a floppy disk, a magnetic media (e.g., a magnetic tape), an optical media (e.g., CD-ROM, DVD, magneto-optical media (e.g., a floptical disk)), an embedded memory, and the like. The instructions may include a code made by a compiler or a code executable by an interpreter.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a hinge;
   a first housing including a first side member configured to surround a first inner space disposed on a side of the hinge;
   a second housing including a second side member configured to surround a second inner space disposed on an opposite side of the hinge from the side that the first side member is disposed; and
   a display, at least a portion of which is folded, the display disposed in a space provided by the first housing and the second housing,
   wherein at least one of the first side member and the second side member includes:
      a plurality of conductive areas spaced apart from each other;
      at least one non-conductive area disposed between the plurality of conductive areas to bond the plurality of conductive areas; and
      at least one bridge member at least partially surrounded by the at least one non-conductive area and configured to connect at least two of the plurality of conductive areas,
   wherein the at least one bridge member includes a first inside surface disposed to face a first direction away from the first inner space and the second inner space and configured to connect a first inner surface of one of the plurality of conductive areas with a second inner surface of another one of the plurality of conductive areas, and
   wherein the first inner surface is configured to form a corner with a first outer surface of the one of the plurality of conductive areas and the second inner surface is configured to form a corner with a second outer surface of the other one of the plurality of conductive areas.

2. The electronic device of claim 1, wherein:
   the first outer surface is configured to face the first direction away from the first inner space and the second inner space; and
   the second outer surface is configured to face the first direction the same as the first outer surface.

3. The electronic device of claim 2, wherein the at least one bridge member includes:
   a second inside surface disposed to face a second direction opposite to the first direction;
   an upper surface disposed to face toward the display and configured to form a corner with the first inside surface; and
   a lower surface disposed to face away from the display and configured to form a corner with the first inside surface.

4. The electronic device of claim 3, wherein the first inside surface includes at least one curved area concavely formed in the first direction.

5. The electronic device of claim 4, wherein the first inside surface includes:
   a first curved area connected with the first inner surface;
   a second curved area connected with the second inner surface; and
   a flat area disposed between the first curved area and the second curved area, the flat area is flat toward the first direction.

6. The electronic device of claim 3, wherein the at least one bridge member includes at least one of a concave area and a convex area configured to make contact with the non-conductive area.

7. The electronic device of claim 6, wherein at least one of the concave area and the convex area is formed in a polygonal shape, a tapered shape, a curved shape having a curvature, or a stepped shape.

8. The electronic device of claim 3, wherein the at least one bridge member includes a first inner groove concavely formed in a direction opposite to the first inner space from the first inside surface.

9. The electronic device of claim 3, wherein at least one of the first inside surface, the second inside surface, the upper surface, and the lower surface configured to make contact with the non-conductive area includes a bumpy structure.

10. The electronic device of claim 1, wherein:
    the first side member includes:
       a first conductive area and a second conductive area included in the plurality of conductive areas;
       a first non-conductive area included in the at least one non-conductive area and disposed between the first conductive area and the second conductive area to bond the first conductive area and the second conductive area; and
       a first bridge member included in the at least one bridge member and configured to connect the first conductive area and the second conductive area, the first bridge member at least partially surrounded by the first non-conductive area, and
    the second side member includes:
       a third conductive area and a fourth conductive area included in the plurality of conductive areas;
       a second non-conductive area included in the at least one non-conductive area and disposed between the third conductive area and the fourth conductive area to bond the third conductive area and the fourth conductive area; and
       a second bridge member included in the at least one bridge member and configured to connect the third conductive area and the fourth conductive area, the second bridge member at least partially surrounded by the second non-conductive area.

11. The electronic device of claim 10, wherein the first non-conductive area and the second non-conductive area are substantially aligned in a folded state of the first housing and the second housing.

12. The electronic device of claim 11, wherein in a folded state of the electronic device, at least a portion of the first bridge member overlaps at least a portion of the second bridge member.

13. The electronic device of claim 11, wherein in a folded state of the electronic device, the first bridge member is staggered with respect to the second bridge member.

14. The electronic device of claim 1, wherein:
    the at least one bridge member is formed of a same material as at least one of the plurality of conductive areas, and
    the non-conductive area is formed of a polymer material.

15. The electronic device of claim 1, wherein the at least one bridge member is formed of a metallic material having a higher elastic force than at least one of the plurality of conductive areas.

16. A foldable housing foldable with respect to a hinge, the foldable housing comprising:

a first housing including a first side member configured to surround a first inner space disposed on a side of the hinge; and a second housing including a second side member configured to surround a second inner space disposed on an opposite side of the hinge from the side that the side that the first side member is disposed, wherein the first side member includes:
a first conductive area including a first inner surface;
a second conductive area including a second inner surface disposed to face the first inner surface;
a first bridge member configured to connect the first conductive area and the second conductive area in the first inner space; and
a first non-conductive area disposed between the first inner surface, the second inner surface, and the first bridge member to bond the first conductive area, the second conductive area, and the first bridge member, and wherein the second side member includes:
a third conductive area symmetrical to the first conductive area with respect to the hinge, the third conductive area including a third inner surface;
a fourth conductive area including a fourth inner surface disposed to face the third inner surface;
a second bridge member configured to connect the third conductive area and the fourth conductive area in the second inner space; and
a second non-conductive area disposed between the third inner surface, the fourth inner surface, and the second bridge member to bond the third conductive area, the fourth conductive area, and the second bridge member.

17. The foldable housing of claim 16, wherein at least one of the first bridge member and the second bridge member includes:

a first inside surface including at least one curved area concavely formed in a first direction opposite to the at least one of the first inner space and the second inner space and configured to connect the first inner surface and the second inner surface, the first inside surface;
a second inside surface disposed to face a second direction opposite to the first inside surface;
an upper surface substantially perpendicular to the first inside surface and the second inside surface and forms a corner with the first inside surface; and
a lower surface that forms a corner with the first inside surface and face away from the upper surface.

18. The foldable housing of claim 17, wherein the first inside surface includes:
a first curved area connected with the first inner surface;
a second curved area connected with the second inner surface; and
a flat area disposed between the first curved area and the second curved area, the flat area is flat toward the first direction.

19. The foldable housing of claim 17, wherein:
at least one of the first bridge member and the second bridge member includes, on at least one of the upper surface and the lower surface, at least one of a concave area and a convex area configured to make contact with at least one of the first non-conductive area and the second non-conductive area, and
at least one of the concave area and the convex area is formed in a polygonal shape, a tapered shape, a curved shape having a curvature, or a stepped shape.

20. The foldable housing of claim 16, wherein at least a partial area of at least one of the first bridge member and the second bridge member has a concave curvature in a direction opposite to at least one of the first inner space and the second inner space.

* * * * *